United States Patent [19]

Dietz et al.

[11] Patent Number: 4,845,203

[45] Date of Patent: Jul. 4, 1989

[54] FIBRE-REACTION DISAZO DYES WITH A BI-REACTION MOIETY COMPRISING A HALOTRIAZINE AND VINYLSULFONYL TYPE RADICAL

[75] Inventors: Rolf Dietz, Basel; Herbert Seiler, Riehen, both of Switzerland

[73] Assignee: Ciba-Geigy Corporation, Ardsley, N.Y.

[21] Appl. No.: 92,794

[22] Filed: Sep. 3, 1987

[30] Foreign Application Priority Data

Sep. 12, 1986 [CH] Switzerland .................. 3665/86

[51] Int. Cl.[4] .................. C09B 62/513; C09B 62/475; C09B 62/83; D06P 1/384
[52] U.S. Cl. .................. 534/637; 534/617; 534/641; 534/642; 534/643
[58] Field of Search .............. 534/617, 630, 632, 637, 534/640, 641, 642, 643

[56] References Cited

U.S. PATENT DOCUMENTS

| | | | |
|---|---|---|---|
| 2,265,425 | 12/1941 | Fischer et al. | 534/643 X |
| 3,036,058 | 5/1962 | Andrew et al. | 534/637 X |
| 3,038,893 | 6/1962 | Andrew | 534/637 X |
| 3,057,844 | 10/1962 | Andrew et al. | 534/637 |
| 3,057,846 | 10/1962 | Andrew et al. | 534/637 |
| 3,419,542 | 12/1968 | Meininger et al. | 534/642 |
| 3,507,850 | 4/1970 | Cohen et al. | 534/643 |
| 3,692,462 | 9/1972 | Back et al. | 534/643 X |
| 3,775,050 | 11/1973 | Kullman et al. | 534/637 |
| 4,645,832 | 2/1987 | Niwa et al. | 534/637 |

FOREIGN PATENT DOCUMENTS

| | | | |
|---|---|---|---|
| 0144766 | 12/1985 | European Pat. Off. | 534/641 |
| 1156916 | 11/1963 | Fed. Rep. of Germany | 534/637 |
| 1211550 | 3/1960 | France | 534/637 |
| 1390548 | 1/1965 | France | 534/637 |
| 62-84160 | 4/1967 | Japan | 534/637 |
| 62-141071 | 6/1967 | Japan | 534/637 |
| 2023158 | 12/1979 | United Kingdom | 534/637 |
| 2063284 | 6/1981 | United Kingdom | 534/637 |

*Primary Examiner*—Floyd D. Higel
*Attorney, Agent, or Firm*—Wenderoth, Lind & Ponack

[57] ABSTRACT

A fibre-reactive dye of the formula

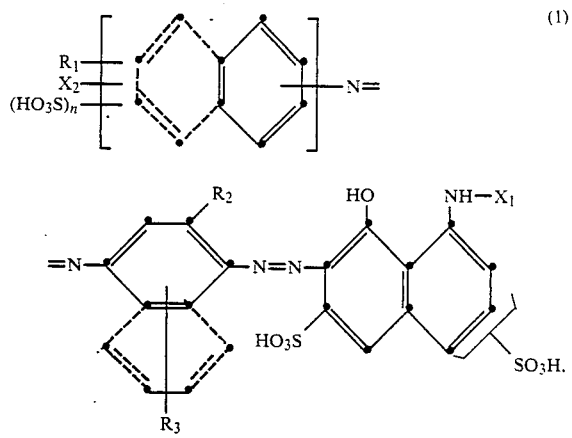

in which
$R_1$ is hydrogen, halogen, $C_{1-14}$-alkyl, $C_{1-4}$-alkoxy, nitro or carboxyl;
$X_2$ is hydrogen, vinylsulfonyl, $\beta$-chloroethylsulfonyl, $\beta$-sulfatoethylsulfonyl, $\beta$-acetoxyethylsulfonyl or a radical of the formula Cl—CH$_2$—CH$_2$—SO$_2$—CH$_2$—CH$_2$—CH$_2$—CO—NH— or Cl—CH$_2$—CH$_2$—SO$_2$—CH$_2$—CH$_2$—NH—CO—;

n is 1 to 3;
$R_2$ is $C_1$-$C_4$alkyl or $C_1$-$C_4$alkoxy; $R_3$ is hydrogen $C_1$-$C_4$alkyl, $C_1$-$C_4$alkoxy, acetylamino, sulfoacetylamino, ureido or sulfo; and
$X_1$ is a radical of the formula

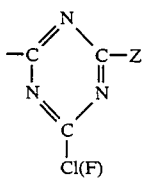

in which Z is the radical of an amine comprising a vinylsulfonyl moiety, subject to the proviso that Z must not be a vinylsulfonylphenylamino or vinylsulfonylnaphtylamino moiety. These dyes are useful for dyeing and printing a wide variety of materials, and in particular cellulose-containing fibre materials.

14 Claims, No Drawings

FIBRE-REACTION DISAZO DYES WITH A BI-REACTION MOIETY COMPRISING A HALOTRIAZINE AND VINYLSULFONYL TYPE RADICAL

The present invention relates to novel reactive dyes, to processes for their preparation and their use for dyeing or printing fibre materials.

The practice of dyeing with reactive dyes has recently led to increased demands on the quality of the dyeings and the economics of the dyeing process. There consequently continues to exist a demand for new reactive dyes which have improved properties, in particular application properties.

The present invention had for its object to find new, improved reactive dyes which dye cotton in the shades blue and navy. The new dyes would be distinguished in particular by high degrees of fixation and high fibre-dye bond stabilities, they were in particular to be suitable for dyeing by the exhaust method and the cold pad-batch method and also be suitable for printing, and in addition the unfixed portions of the fibre were to be easily washed off. Furthermore, the dyeings and prints obtainable with the new dyes were required to have good all-round fastness qualities, for example light and wet fastness properties.

It has been found that the stated object is achieved with the novel reactive dyes defined hereinafter.

The present invention accordingly provides reactive dyes of the formula

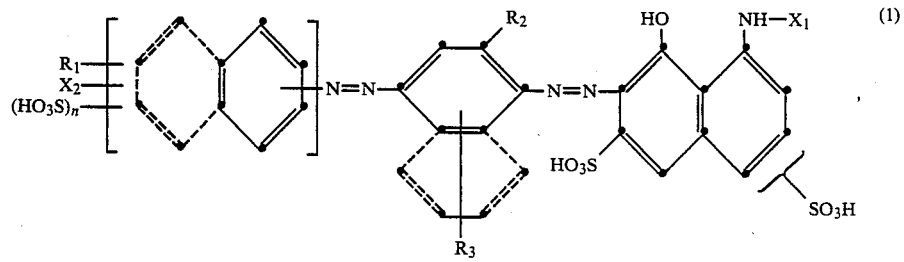

in which $R_1$ is hydrogen, halogen, $C_{1-4}$-alkyl, $C_{1-4}$-alkoxy, nitro or carboxyl; $R_2$ is $C_{1-4}$-alkyl or $C_{1-4}$-alkoxy; $R_3$ is hydrogen, $C_{1-4}$-alkyl, $C_1$-$C_4$-alkoxy, acetylamino, ureido or sulfo; n is 1 to 3; and $X_1$ and $X_2$ are independently of each other hydrogen or a substituent, at least one of the two substituents $X_1$ and $X_2$ being a fibre-reactive radical; subject to the proviso that $X_1$ is not a radical of the formula

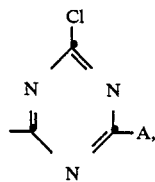

in which A is chlorine or unsubstituted or sulfo-, carboxyl- or β-sulfatoethylsulfonyl-substituted phenylamino when $X_2$ is a non-fibre-reactive radical.

In the definitions given above of the radicals $R_1$, $R_2$ and $R_3$, halogen is fluorine, chlorine or bromine; $C_{1-4}$-alkyl is methyl, ethyl, propyl, isopropyl, n-butyl, isobutyl, sec.-butyl or tert.-butyl; and $C_{1-4}$-alkoxy is methoxy, ethoxy, propyloxy, isopropyloxy, n-butyloxy, isobutyloxy, sec.-butyloxy or tert.-butyloxy. Preferably, $R_1$, $R_2$ and $R_3$ insofar as applicable, are hydrogen, chlorine, methyl, ethyl, methoxy, ethoxy, nitro, carboxyl, acetylamino, ureido or sulfo. If the part enclosed in square brackets is a benzene radical, n is preferably 1 or 2; if the part in question is a naphthalene radical, n is preferably 2 or 3.

If $X_1$ or $X_2$ is not hydrogen but a substituent, it can be in particular a non-fibre-reactive or a fibre-reactive radical. Non-fibre-reactive radicals $X_1$ are in particular acyl radicals, for example alkanoyl radicals, such as acetyl, propionyl or butyryl; or aracyl radicals, such as benzoyl or phenylsulfonyl, it being possible for the benzene nuclei to carry further substituents, for example chlorine, methyl, ethyl, methoxy, ethoxy, nitro, carboxyl or sulfo. Suitable non-fibre-reactive radicals $X_2$ are in particular the same radicals as mentioned above for $R_1$, and also further alkanoylamino radicals, such as propionylamino or butrylamino and aracylamino radicals, such as benzoylamino or benzenesulfonylamino, in this case too it being possible for the benzene nuclei to be further substituted, for example by chlorine, methyl, ethyl, methoxy, ethoxy, nitro, carboxyl or sulfo.

At least one of the two substituents $X_1$ and $X_2$ shall be a fibre-reactive radical. The fibre-reactive radical $X_1$ or $X_2$ is a low molecular weight alkanoyl or alkylsulfonyl radical which is substituted by a detachable atom or a detachable group; a low molecular weight alkenoyl or alkenesulfonyl radical which can be substituted by a detachable atom or a detachable group; a carboxyclic or heterocyclic radical which contain 4-, 5- or 6-rings, which is bonded via a carbonyl or sulfonyl group and which is substituted by a detachable atom or a detachable group; or a triazine or pyrimidine radical which is bonded directly via a carbon atom and is substituted by a detachable atom or a detachable group; or contains such a radical. Examples of such reactive radicals are a six-membered heterocyclic radical bonded via an amino group and containing halogen atoms, such as a halotriazine or halopyrimidine radical, or an aliphatic acyl radical, such as a halopropionyl or haloacryloyl radical, or a directly bonded β-haloethylsulfonyl, β-sulfatoethylsulfonyl or vinylsulfonyl radical. The reactive radical $X_1$ is preferably a halotriazine or halopyrimidine radical or the radical of a fibre-reactive acyl compound which is bonded via the carbonyl group to the —NH— group of the H(K) acid, for example an α,β-dibromopropionyl radical. $X_1$ is also to be understood as meaning reactive radicals which are bonded to the —NH— group via a bridge member, for example aminobenzoyl. In some cases, the radical $X_1$ can carry a substituent which itself contains a fibre-reactive radical. Suitable for this purpose are in particular halotriazine radicals to which a vinylsulfonyl radical or an equivalent group, for example β-chloroethylsulfonyl, is bonded via an aliphatic, aromatic, mixed aliphatic-aromatic or heterocyclic bridge member. Examples of preferred bridge member radicals which can stand for $X_1$ are the following:

—COCH$_2$CH$_2$CH$_2$SO$_2$CH$_2$CH$_2$Cl

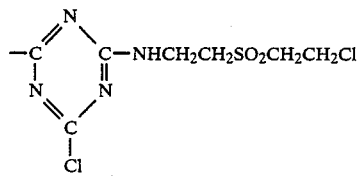

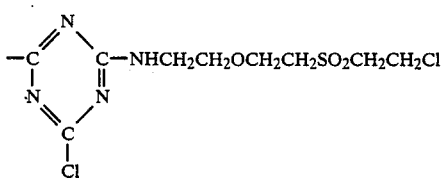

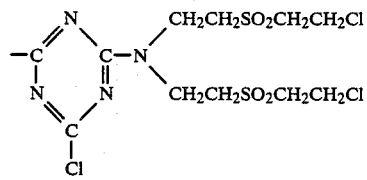

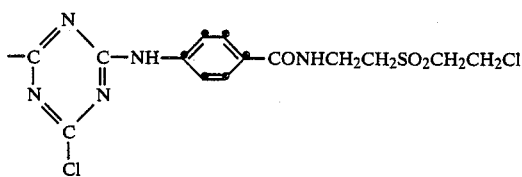

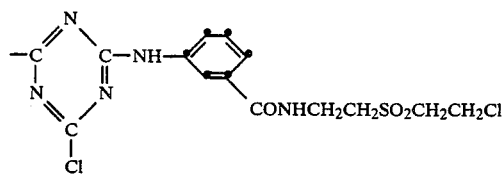

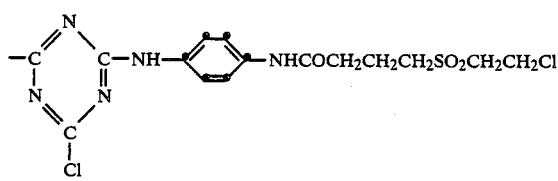

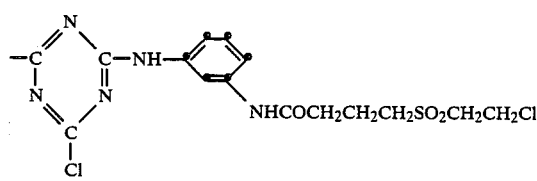

-continued

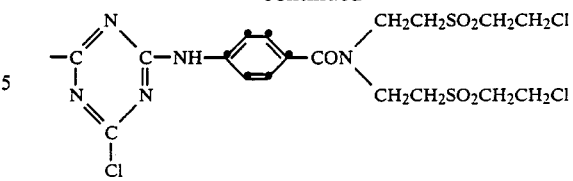

and the corresponding fluorotriazine radicals. Furthermore, reactive radicals $X_1$ are preferably chlorotriazine or fluorotriazine radicals which contain a non-fibre-reactive substituent, for example —NH$_2$, β-sulfoethylamino, β-hydroxyethylamino, N,N-di-β-hydroxyethylamino, morpholino, methoxy, isopropoxy or the like; and halopyrimidine radicals, for example the 2,4-difluoropyrimid-6-yl radical and the 2,4-difluoro-5-chloropyrimid-6-yl radical. The reactive radical $X_2$ is bonded to the benzene or naphthalene nucleus directly or via a bridge member. For $X_2$, the same reactive radicals come into consideration as mentioned above in the explanation of the reactive radical $X_1$, for example the halotriazine or halopyrimidine radicals mentioned; they are preferably bonded to the benzene or naphthalene nucleus via an —NH— or —NH—CH$_2$— group. But other bridge members are also possible, when $X_2$ is for example a radical of the formula ClCH$_2$CH$_2$SO$_2$CH$_2$CH$_2$CH$_2$CONH— or a radical of the formula
ClCH$_2$CH$_2$SO$_2$CH$_2$CH$_2$NHCO—

A reactive radical $X_2$ bonded directly to the benzene or naphthalene nucleus is in particular a vinylsulfonyl radical or an equivalent radical, for example a β-chloroethylsulfonyl, β-sulfatoethylsulfonyl, β-thiosulfatoethylsulfonyl, β-phosphatoethylsulfonyl or β-acetoxyethylsulfonyl radical. Preferably, $X_1$ is one of the above-mentioned mono- or bireactive halotriazine radicals and $X_2$ is hydrogen, a non-reactive substituent or a vinylsulfonyl radical or one of the equivalent radicals mentioned, for example β-sulfatoethylsulfonyl.

Preference is given in particular to:
(a) reactive dyes of the formula

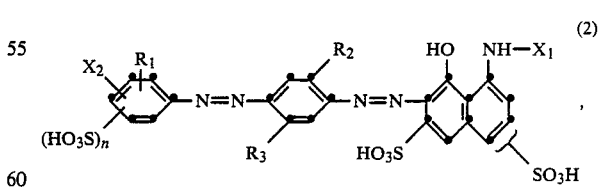

in which $R_1$ is hydrogen, chlorine, methyl, ethyl, methoxy, ethoxy, nitro or carboxyl; $R_2$ is methyl, ethyl, methoxy or ethoxy; $R_3$ is hydrogen, methyl, ethyl, methoxy, ethoxy, acetylamino, ureido or sulfo; n is 1 or 2; and $X_1$ and $X_2$ are as defined under the formula (1);
(b) reactive dyes of the formula

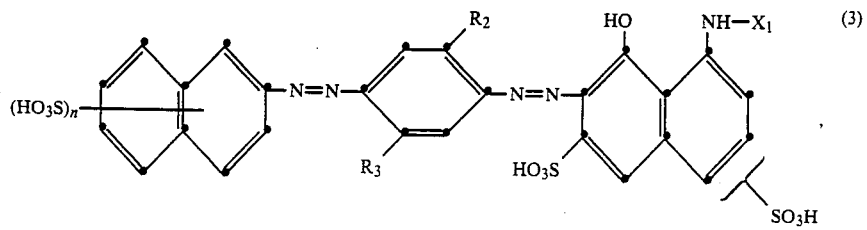
(3)

in which $R_2$ is methyl, ethyl, methoxy or ethoxy; $R_3$ is hydrogen, methyl, ethyl, methoxy, ethoxy, acetylamino, ureido or sulfo; n is 1 to 3; and $X_1$ is a fibre-reactive radical;

(c) reactive dyes of the formula

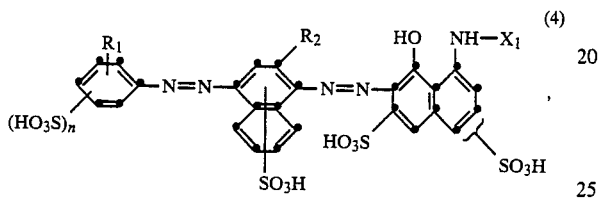
(4)

in which $R_1$ is hydrogen, chlorine, methyl, ethyl, methoxy, ethoxy, nitro or carboxyl; $R_2$ is methyl, ethyl, methoxy or ethoxy; n is 1 to 2, and $X_1$ is a fibre-reactive radical;

(d) reactive dyes of the formula

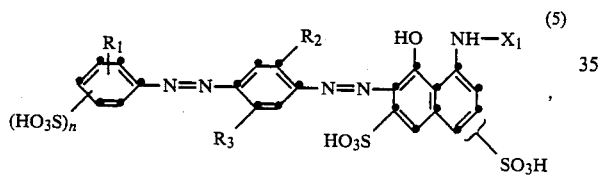
(5)

in which $R_1$, $R_2$, $R_3$ and n are as defined under the formula (2); and $X_1$ is a fibre-reactive radical;

(e) reactive dyes of the formula

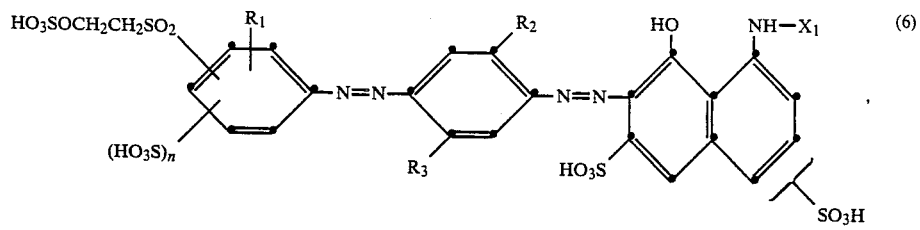
(6)

in which $R_1$, $R_2$, $R_3$ and n are as defined under the formula (2); and $X_1$ is a fibre-reactive radical;

(f) reactive dyes according to one of the formulae (1) to (6) in which $X_1$ is a fibre-reactive triazine or pyrimidine radical;

(g) reactive dyes according to (f) in which $X_1$ is a radical of the formula

(7)

or of the formula

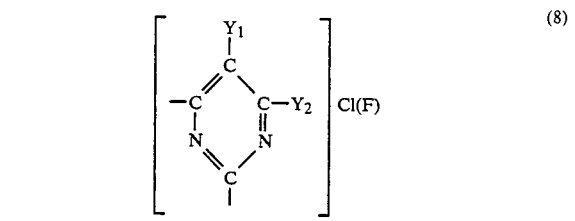
(8)

in which Z is a substituted or unsubstituted amino, hydroxyl or mercapto group; $Y_1$ is hydrogen or a substituent; and $Y_2$ is hydrogen, halogen, a substituted or unsubstituted alkyl, alkenyl, aralkyl or aryl radical, or substituted or unsubstituted carboxylic acid ester, carboxamide, alkylsulfonyl or arylsulfonyl group;

(h) reactive dye according to (g), of the formula

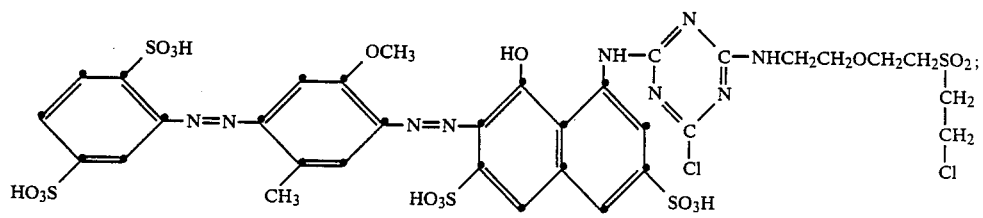
(9)

(i) reactive dye according to (g), of the formula

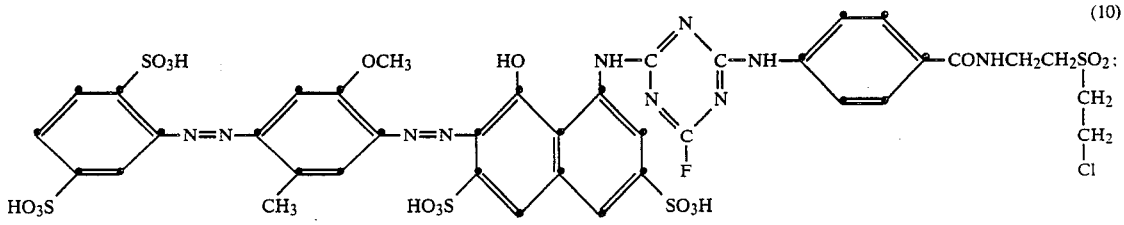

(j) reactive dye according to (g), of the formula

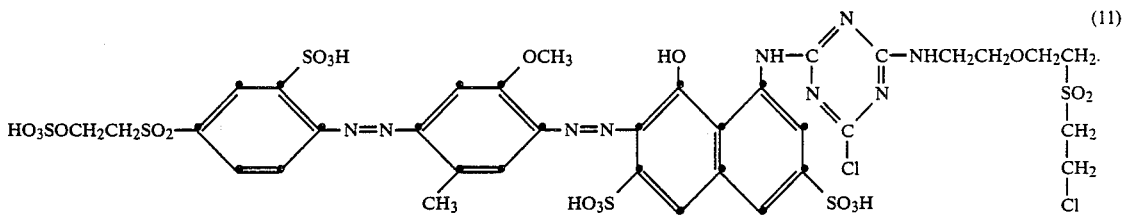

Preference is further given to:
(k) reactive dyes of the formula

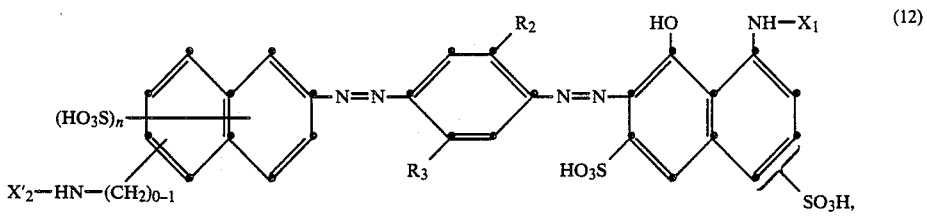

in which $R_2$ is methyl, ethyl, methoxy or ethoxy; $R_3$ is hydrogen, methyl, ethyl, methoxy, ethoxy, acetylamino, ureido or sulfo; n is 1 to 2; and $X_1$ and $X'_2$ are each a fibre-reactive radical;

(l) reactive dyes of the formula

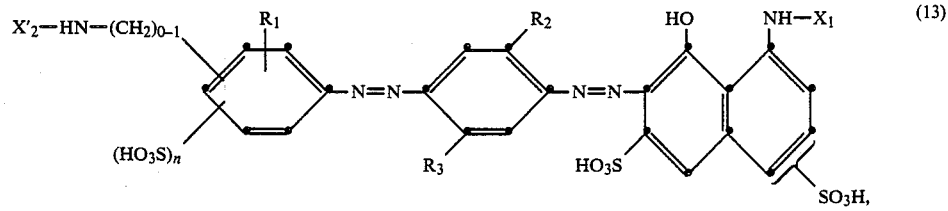

in which $R_1$ is hydrogen, chlorine, methyl, ethyl, methox, ethoxy, nitro or carboxyl; $R_2$, $R_3$ and n are as defined in the formula (2); and $X_1$ and $X'_2$ are each a fibre-reactive radical;

(m) reactive dyes of the formula

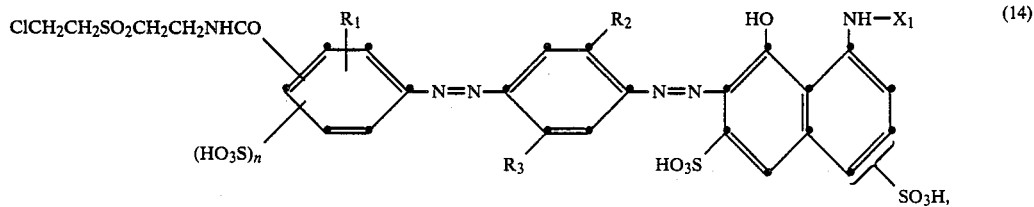

in which $R_1$, $R_2$, $R_3$ and n are as defined in the formula (2); and $X_1$ is a fibre-reactive radical.

The process for preparing reactive dyes of the formula (1) comprises introducing a radical $X_1$ and/or $X_2$ into corresponding disazo dyes or precursors thereof, or, if dye precursor is used, converting the resulting intermediates into the desired end dyes and if desired following up with a further conversion reaction.

The secondary disazo dyes are prepared in a manner known per se by diazotizing and coupling. The reactive radicals $X_1$ and $X_2$ are introduced subsequently or are already present in the precursors. For instance, it is possible to use a diazo component which already contains the reactive radical $X_2$. Said diazo component is diazotized and coupled onto a central component, the resulting monoazo intermediate is diazotized and coupled onto H(K) acid, which can subsequently be acylated with a reactive component, for example α,β-dibromopropionyl chloride, 2,4,6-trichloro-s-triazine, 2,4-difluoro-6-amino-s-triazine or 2,4,6-trifluoro-5-chloropyrimidine. However, the H(K) acid can also be acylated with a reactive component before the second coupling; on the other hand, a reactive radical $X_2$ can also be introduced after a completed first or second coupling.

The diazotization of the diazo domponents or of the intermediates containing a diazotized amino group is in general effected through the action of nitrous acid in an aqueous mineral acid solution at a low temperature to room temperature. The coupling onto the coupling component is effected at strongly acid, neutral or weakly alkaline pH.

If $X_1$ or $X_2$ is a reactive radical bonded via an amino group, the condensation of the corresponding reactive components with the diazo components or the coupling components or with acylatable monoazo or disazo intermediates or with the amino-containing dyes or precursors thereof is preferably effected in aqueous solution or suspension, at low temperatures and at a weakly acid, neutral or weakly alkaline pH. Advantageously, the hydrogen and halide freed in the course of the condensation is continuously neutralized by adding aqueous alkali metal hydroxides, carbonates or bicarbonates.

A modified embodiment of the process comprises first preparing a dye which contains a precursor of a reactive radical and subsequently converting this precursor into the final stage, for example by esterification or an addition reaction. For example, it is possible to prepare a dye in which $X_2$ is an $HO-CH_2CH_2-SO_2-$ radical and to react an intermediate before or after the acylation with sulfuric acid, so that the hydroxyl group is converted into a sulfato group; or to use an analogous dye in which $X_2$ is an $H_2C=CH-SO_2-$ group and to add thiosulfuric acid onto the intermediate to form an $HO_3SS-CH_2CH_2-SO_2-$ radical. The sulfation of the hydroxyl group in a dye of the formula (1) or in a suitable precursor is effected for example by reaction with concentrated sulfuric acid at 0° C. to moderately elevated temperature. The sulfation can also be effected by reaction of the hydroxy compound with two equivalents of chlorosulfonic acid per hydroxyl group in a polar organic solvent, for example N-methylpyrrolidone, at 10° to 80° C. Preferably, the sulfation is effected by adding the compound in question to sulfuric acid monohydrate at temperatures between 5° and 15° C. The introduction of another radical for $X_2$ into a compound of the formula (1) or an intermediate in place of a halogen atom or the sulfato group, for example a thiosulfato or phosphato group, is effected in a manner known per se. Similar conversions can also be carried out when the radical $X_1$ contains one of the sulfonyl groups mentioned.

It is also possible to carry out elimination reactions after the synthesis. For example, reactive dyes of the formula (1) which contain sulfatoethylsulfonyl radicals can be treated with agents which eliminate hydrogen halide, such as sodium hydroxide, to convert the sulfatoethylsulfonyl radicals into vinylsulfonyl radicals.

The most important process variants are illustrated in the working examples.

Examples of starting compounds which, depending on the structure of the desired final dye, can be used are the following.

DIAZO COMPONENTS

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-amino-benzene-2-, -3- or -4-sulfonamide, 1-aminobenzene-2-, -3- or -4-carboxylic acid, 1-amino-3-trifluoromethylbenzene-6-sulfonic acid, 1-aminobenzene-2-, -3- or -4-sulfonic acid, 1-amino-benzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methylbenzene-2,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, 1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid, 1-amino-4-β-sulfatoethylsulfonylbenzene, 1-amino-4-β-thiosulfatoethylsulfonylbenzene, 1-amino-4-vinylsulfonylbenzene, 1-amino-4-β-chloroethyl sulfonylbenzene, 1-amino-3-β-sulfatoethylsulfonylbenzene, 1-amino-3-vinylsulfonylbenzene, 1-amino-2-methoxy-5-β-sulfatoethylsulfonylbenzene, 1-amino-2-methoxy-5-β-thiosulfatoethylsulfonylbenzene, 1-amino-2-methoxy-5-vinylsulfonylbenzene, 1-amino-4-methoxy-3-β-sulfatoethylsulfonylbenzene, 1-amino-4-methoxy-3-β-vinylsulfonylbenzene, 1-amino-2,5-dimethoxy-4-β-sulfatoethylsulfonylbenzene, 1-amino-2,5-dimethoxy-4-vinylsulfonylbenzene, 1-amino-2-methoxy-4-β-sulfatoethylsulfonyl-5-methylbenzene, 1-amino-2-methoxy-4-vinylsulfonyl-5-methylbenzene, 1-amino-3-β-sulfatoethylsulfonyl-6-carboxybenzene, 1-amino-3-vinylsulfonyl-6-carboxybenzene, 1-amino-4-β-sulfatoelhylsulfonylbenzene-2-sulfonic acid, 1-amino-4-vinylsulfonylbenzene-2-sulfonic acid, 1-amino-5-vinylsulfonylbenzene-2,4-disulfonic acid, 1-amino-4-(α,β-dibromopropionylamino)-benzene-2-sulfonic acid, 1-amino-2-bromo-4-β-sulfatoethylsulfonylbenzene, 1-amino-2,6-dichloro-4-β-sulfatoethylsulfonylbenzene, 1-amino-2,4-di(β-sulfatoethylsulfonyl)-benzene, 1-amino-2,4-di-(β-sulfatoethylsulfonyl)-5-chlorobenzene, 1-amino-2,4-di-(β-thiosulfatoethylsulfonyl)-5-chlorobenzene, 1-amino-2,4-di-(vinylsulfonyl)-benzene, 1-amino-2,4-di-(vinylsulfonyl)-5-chlorobenzene, 1-amino-2,4-di-(β-acetoxyethylsulfonyl)-benzene, 1-amino-2,4-di(β-acetoxyethylsulfonyl)-5-chlorobenzene, 2-amino-8-β-sulfatoethylsulfonylnaphthalene, 2-amino-6-β-sulfatoethylsulfonylnaphthalene, 2-amino-6-β-sulfatoethylsulfonylnaphthalene-1-sulfonic acid, 2-amino-8-β-sulfatoethylsulfonylnaphthalene-6-sulfonic acid, 2-amino-6,8-di-(β-sulfatoethylsulfonyl)-naphthalene.

It is further necessary to mention the corresponding β-hydroxy compounds which can be used as precursors, for example, 1-amino-4-β-hydroxyethylsulfonylbenzene, 1-amino-3-β-hydroxyethylsulfonylbenzene, 1-amino-2,4-di-(β-hydroxyethyethylsulfonyl)-benzene and 1-amino-2,4-di-(β-hydroxyethylsulfonyl)-5-chlorobenzene.

3-Amino-N'-β-(β'-chloroethylsulfonyl)-ethylbenzamide,
4-chloro-3-amino N'-β-(β'-chloroethylsulfonyl)-ethylbenzamide,
4-methyl-3-amino-N'-β-(β'-chloroethylsulfonyl)-ethylbenzamide,
4methoxy-3-amino-N'-β-(β'-chloroethylsulfonyl)-ethylbenzamide,
3-amino-N'-β-[β'-(β''-chloroethylsulfonyl)-ethyloxy]-ethylbenzamide,
3-amino-N'-γ-(β'-chloroethylsulfonyl)-propylbenzamide,
3-amino-N'-bis-[β-(β'-chloroethylsulfonyl)ethyl]-benzamide,
3-amino-N'-bis-[γ-(β'-chloroethylsulfonyl)propyl]-benzamide,
4-amino-N'-β-(β'-chloroethylsulfonyl)-ethylbenzamide,
4-amino-N'-β-[β'-(β''-chloroethylsulfonyl)-ethyloxy]-benzamide,
4-amino-N'-γ-(β'-chloroethylsulfonyl)-propylbenzamide,
4-amino-N'-bis-[β-(β'-chloroethylsulfonyl)ethyl]benzamide,
4-amino-N'-bis-[γ-(β'-chloroethylsulfonyl)-propyl]-benzamide,
4-amino-N'-β-(vinylsulfonyl)ethylbenzamide,
4-amino-N'-bis-[β-(vinylsulfonyl)-ethyl]-benzamide,
4-amino-N'-δ-(β'-chloroethylsulfonyl)butylbenzamide,
4-chloro-3-amino-N'-bis-[β-(β'-chloroethylsulfonyl)ethyl]benzamide,
4-methyl-3-amino-N'-bis-[β-(β'-chloroethylsulfonyl)-ethyl]benzamide,
4-methoxy-3-amino-N'-bis-[γ-(β'-chloroethylsulfonyl)-propyl]-benzamide,
3-amino-N'-δ-(β'-chloroethylsulfonyl)-butylbenzamide,
3-amino-N'-β-[β'-(β''-chloroethylsulfonyl)ethyloxy]-ethylbenzamide, 4-methoxy-3-amino-N'-bis-[β-(β'-chloroethylsulfonyl)ethyl]-benzamide.

If the diazo component to be used is not a diamine but an aminoacetylamino compound from which the acetyl group is subsequently eliminated again by hydrolysis, as is mentioned above in the explanation of the process, the possibilities are the monoacetyl compounds of the abovementioned diazo components, for example 1-acetylamino-3-aminobenzene-4-sulfonic acid or 1-acetylamino-4-aminobenzene-3-sulfonic acid.

Possible central components are partly the same compounds as mentioned above as diazo components, although their structure defined in the formula (1) has to be complied with. Important central components are for example 1-amino-2-methoxy-5-methylbenzene, 1-amino-2,5-dimethylbenzene, 1-amino-2-methoxy-5-acetylaminobenzene, 1-amino-3-hydroxyacetylaminobenzene, 1-aminonaphthalene-6- or -8-sulfonic acid and 1-amino-2-methoxynaphthalene-6-sulfonic acid, 1-amino-2-methylbenzene, 1-amino-2-methoxybenzene, 1-amino-2-ethoxybenzene, 1-amino-2,5-dimethylbenzene, 1-amino-2,5-dimethoxybenzene, 1-amino-2-methylbenzene-5-sulfonic acid, 1-amino-2-methoxybenzene-5-sulfonic acid, 1-amino-2-methyl-5-acetylaminobenzene, 1-amino-2-methoxy-5-sulfoacetylaminobenzene, 1-amino-2-methoxy-5-ureidobenzene, 1-amino-2-methyl-5-ureidobenzene.

COUPLING COMPONENTS

1-Amino-8-hydroxynaphthalene-3,6- or -4,6-disulfonic acid, 1-acetylamino-8-hydroxynaphthalene-3,6- or -4,6-disulfonic acid, 1-benzoylamino-8-hydroxynaphthalene-3 6- or -4,6-disulfonic acid, 1-(3'-aminobenzoylamino)-8-hydroxynaphthalene-3,6- or -4,6-disulfonic acid and 1-(4'-aminobenzoylamino)-8-hydroxynaphthalene-3,6- or -4,6-disulfonic acid.

If $X_1$ is a halotriazine radical bonded to the amino group of the H(K) acid or $X_2$ is a halotriazine radical bonded to the benzene or naphthalene nucleus via an —NH— or —NH—CH$_2$— group, it is possible, by prior or subsequent condensation with an amino, hydroxy or mercapto compound, to replace a halogen atom on the triazine ring with an amino, alkoxy, aryloxy, alkylthio or arylthio radical. Examples of such amino, hydroxy and mercapto compounds are the following: ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, naphth-1-ylamine, naphth-2-ylamine, orthanilic acid, metanilic acid, sulfanilic acid, anilin-2,4-disulfonic acid, anilin-2,5-disulfonic acid, anthranilic acid, m- and p-aminobenzoic acid, 2-amino-toluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4- -2,5- -2,7- -2,8-, -3,5-, -3,6- -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzthiazole, 5-, 6- and 8-aminoquinoline, 2-aminopyrimidine, morpholine, piperidine, piperazine, water, methanol, ethanol, propanol, isopropanol, n-butanol, isobutanol, sec.-butanol, tert.-butanol, hexanol, cyclohexanol, β-methoxyethanol, β-ethoxyethanol, γ-methoxypropanol, γ-ethoxypropanol, β-ethoxy-β-ethoxyethanol, glycolic acid, pheno, o-, m- and p-chlorophenol, methanethiol, ethanethiol, propanethiol, isopropanethiol, n-butanethiol, thioglycolic acid, thiourea, thiophenol, α-thionaphthol, β-thionaphthol.

It is also possible to use here many of the compounds mentioned for use as diazo components, in particular those which contain a vinylsulfonyl radical or an equivalent or similar reactive radical, and also the compounds:

3-N-Ethylamino-N'-β-(β'-chloroethylsulfonyl)ethylbenzoamide,

3-N-isopropylamino-N'-β-(β'-chloroethylsulfonyl)ethylbenzamide,

3-N-isopropylamino-N'-γ-(β'-chloroethylsulfonyl)-propylbenzamide,

4-N-ethylamino-N'-β-(β'-chloroethylsulfonyl)-ethylbenzamide,

4-N-isopropylamino-N'-γ-(β'-chloroethylsulfonyl)-propylbenzamide.

The condensation of the halotriazines with the amino, hydroxy or mercapto compounds mentioned is effected in a manner known per se, preferably in the presence of alkaline agents.

When $X_1$ and $X_2$ are each a reactive radical, the reactive radicals in question can be identical or diferent. The reactive radical contains a substituent which is or contains a fibre-reactive cleaving group, for example when $X_2$ is β-chloroethyl, or which can become active in the manner of fibre-reactive cleaving groups, for example if $X_2$ is vinyl. Fibre-reactive compounds are to be understood as meaning those which are capable of reacting with the hydroxyl groups of cellulose, the amino, carboxyl, hydroxyl and thiol groups in the case of wool and silk or with the amino and possibly carboxyl groups of synthetic polyamides to form covalent chemical bonds.

The reactive dyes of the formula (1) are suitable for dyeing and printing a very wide variety of materials, such as silk, leather, wool, polyamide fibres and polyurethanes, and in particular cellulose-containing fibre materials of any kind. Such fibre materials are for example the natural cellulose fibre, such as cotton, linen and hemp, and also cellulose pulp and regenerated cellulose. The reactive dyes of the formula (1) are also suitable for dyeing or printing hydroxyl-containing fibres which are present in blend fabrics, for example mixtures of cotton with polyester fibres or polyamide fibres.

The dyes according to the invention can be applied to and fixed on the fibre in various ways, in particular in the form of aqueous dye solutions and print pastes.

They are suitable not only for the exhaust method of dyeing but also for dyeing by the pad-mangling method, whereby the material is impregnated with aqueous, possibly salt-containing dye solutions and the dyes are fixed after an alkali treatment or in the presence of alkali, if desired by heating.

They are likewise suitable for the cold pad-batch process, whereby the dye is applied together with the alkali on a pad-mangle and is then fixed by storing for several hours at room temperature. After fixing, the dyeings and prints are thoroughly rinsed with cold and hot water, in the presence or absence of an agent which has a dispersing action and promotes the diffusion of the unfixed portions.

The reactive dyes of the formula (1) are distinguished by high reactivity and good fixing properties. They can therefore be used for exhaustive dyeing at low dyeing temperatures and require only short steaming times in the pad-steam process.

The degrees of fixation are high, and the unfixed portions can easily be washed off, the difference between the degree of exhaustion and the degree of fixation being remarkably small, i.e. the hydrolysis loss being very small. The reactive dyes of the formula (1) are also suitable for printing, in particular on cotton, but also for printing nitrogen-containing fibres, for example wool, silk or wool-containing blend fabrics.

The dyeings and prints prepared with the dyes according to the invention on cellulose fibre materials have a high tinctorial strength and high fibre-dye bond stability, not only in the acid but also in the alkaline range, and also a good light fastness and very good wet fastness properties, such as wash, water, seawater, cross-dyeing and perspiration fastness properties, and also a good pleating fastness, hot press fastness and rub fastness. Compared with known blue azo dyes, the reactive dyes according to the invention, when dyed onto fabrics finished with synthetic resin, surprisingly exhibit a significantly smaller phototropic effect.

The examples which follow serve to illustrate the invention. The temperatures are given in degrees celsius, and parts and percentages are by weight, unless otherwise stated. Parts by weight relate to parts of volume as the kilogram relates to the liter. The preparation of the monoazo or disazo intermediate compounds has not been described in all cases in the working examples below, but it will be readily apparent from the general description.

EXAMPLE 1

18.5 g of cyanuric chloride are suspended in ice and water in the presence of a dispersant and of a phosphate buffer. To this suspension is added dropwise, at 0° to 2° C. in the course of 15 minutes, an aqueous solution of 31.9 g of 1-amino-β-hydroxynaphthalene-3,6-disulfonic acid, a pH of 1 to 2 being maintained during the condensation. After 1 to 2 hours of subsequent stirring the reaction has ended.

40.1 g of 4-amino-3-methoxy-6-methyl-2',5'-disulfo-1,1'-azobenzene (prepared by diazotization and coupling of 1-aminobenzene-2,5-disulfonic acid with 1-amino-2-methoxy-5-methylbenzene) are dissolved in 400 ml of water under neutral conditions and diazotized at 20° C. with 25 ml of 4N sodium nitrite solution and 25 ml of concentrated hydrochloric acid. After one hour of subsequent stirring, any excess nitrite is removed with sulfamic acid.

At 0° to 5° C. the diazo compound is then added to the above-prepared solution of the reactive coupling component and in the coupling mixture the pH is initially held at 4.5 with 40% sodium acetate solution and later at 7 with 10% sodium carbonate solution. After the coupling has ended, 26.5 g of 2-(β-aminoethoxy)-ethyl 2'-chloroethyl sulfone hydrochloride are added to the solution, and the pH is maintained at 7.5 with 10% sodium carbonate solution. The temperature is gradually raised from 0° to 5° C. to 30° C. After 2 to 3 hours of subsequent stirring, the condensation has ended. The pH is adjusted to 6, the dye is salted out of the solution with sodium chloride, filtered off with suction, washed with 25% sodium chloride solution and dried at 40° C. in vacuo. The dye which, in the form of a free acid, conforms to the formula

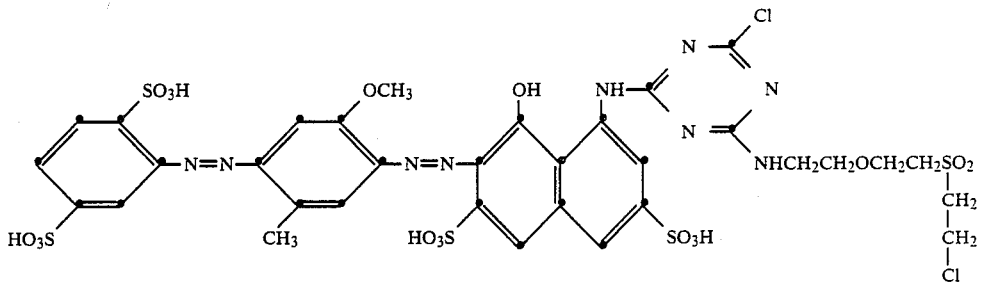

dyes cotton in blue shades having good fastness properties.

In the same way it is possible to prepare the dyes listed in Table 1 below. Dyed onto cotton, they likewise produce blue, wash-fast dyes.

TABLE 1

| No. | Monoazo dye | Coupling component | Reactive component | Amine |
|---|---|---|---|---|
| 1 | 1-Aminobenzene-3-sulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 2 | 1-Aminobenzene-3-sulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 3 | 1-Aminobenzene-3-sulfonic acid → 1-Amino-2-methoxy-5-sulfoacetyl-aminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 4 | 1-Aminobenzene-3-sulfonic acid → 1-Amino-2,5-dimethoxybenzene | 1-Amino-8-hydroxy-naphthalene-3,6-disulfonic acid | 4-(β-Chloroethyl-sulfonyl)-butyryl chloride | — |
| 5 | 1-Aminobenzene-3-sulfonic acid → 1-Amino-2-methoxy-5-acetylamino-benzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 6 | 1-Aminobenzene-4-sulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 7 | 1-Aminobenzene-4-sulfonic acid → 1-Amino-2,5-dimethoxybenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 8 | 1-Aminobenzene-4-sulfonic acid → 1-Amino-2-methoxy-5-acetylamino-benzene | 1-Amino-8-hydroxy-napthalene-3,6-disulfonic acid | 2,4,6-Trichloro-s-triazine | $H_2NCH_2CH_2SO_2CH_2CH_2Cl$ |
| 9 | 1-Amino-4-methoxybenzene-2-sulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 10 | 1-Amino-4-methoxybenzene-2-sulfonic acid → 1-Amino-2,5-dimethoxy-benzene | 1-Amino-8-hydroxy-naphthalene-3,6-disulfonic acid | 4-(β-Chloroethyl-sulfonyl)-butyryl chloride | — |
| 11 | 1-Amino-4-methoxybenzene-2,5-disulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 12 | 1-Amino-4-methoxybenzene-2,5-disulfonic acid → 1-Amino-2,5-dimethoxybenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 13 | 1-Amino-4-methoxybenzene-2,5-disulfonic acid → 1-Amino-2,5-dimethoxybenzene | 1-Amino-8-hydroxy-naphthalene-3,6-disulfonic acid | 4-(β-Chloroethyl-sulfonyl)-butyryl chloride | — |
| 14 | 1-Amino-2-methoxybenzene-5-sulfonic acid → 1-Amino-2-methoxy-5-sulfoacetylaminobenzene | 1-Amino-8-hydroxy-naphthalene-3,6-disulfonic acid | 4-(β-Chloroethyl-sulfonyl)-butyryl chloride | — |
| 15 | 1-Amino-2-methoxybenzene-5-sulfonic acid → 1-Amino-2-methoxy-5-sulfoacetylaminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 16 | 1-Amino-4-methylbenzene-2-sulfonic acid → 1-Amino-2-methoxy-5-methylbenzene | 1-Amino-8-hydroxy-naphthalene-3,6-disulfonic acid | 4-(β-Chloroethyl-sulfonyl)-butyryl chloride | — |
| 17 | 1-Amino-4-methylbenzene-2,5-di- | 1-Amino-8-hydroxy- | 2,4,6-Trichloro-s- | $H_2NCH_2CH_2OCH_2CH_2SO_2CH_2CH_2Cl$ |

TABLE 1-continued

| No. | Monoazo dye | Coupling component | Reactive component | Amine |
|---|---|---|---|---|
|  | sulfonic acid → 1-Amino-2-methoxy-5-acetylaminobenzene | naphthalene-3,6-disulfonic acid | triazine |  |
| 18 | 1-Amino-4-methylbenzene-2,5-disulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 19 | 1-Amino-2-methylbenzene-4-sulfonic acid → 1-Amino-2-methoxy-5-sulfoacetylaminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 20 | 1-Amino-2-methylbenzene-5-sulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 21 | 1-Amino-2-chlorbenzene-5-sulfonic acid → 1-Amino-2-methoxy-5-acetylaminobenzene | 1-Amino-8-hydroxy-naphthalene-3,6-disulfonic acid | 4-($\beta$-Chloroethyl-sulfonyl)-butyryl chloride | — |
| 22 | 1-Amino-4-carboxybenzene → 1-Amino-2-methoxy-5-sulfoacetyl-aminobenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 23 | 1-Amino-4-carboxybenzene-3-sulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 24 | 1-Amino-3-carboxybenzene-6-sulfonic acid → 1-Amino-2-methoxy-5-acetylaminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 25 | 1-Amino-2-carboxybenzene-5-sulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 26 | 1-Aminobenzene-2,5-disulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 27 | 1-Aminobenzene-2,5-disulfonic acid → 1-Amino-2-methoxy-5-methylbenzene | 1-Amino-8-hydroxy-naphthalene-3,6-disulfonic acid | 2,4,6-Trichloro-s-triazine | $HN(CH_2CH_2SO_2CH_2CH_2Cl)_2$ |
| 28 | 1-Aminobenzene-2,5-disulfonic acid → 1-Amino-2-methoxy-5-methyl benzene | 1-Amino-8-hydroxy-naphthalene-3,6-disulfonic acid | 2,4,6-Trichloro-s-triazine | $H_2N$–⟨phenyl(para)⟩–$CONHCH_2CH_2SO_2CH_2CH_2Cl$ |
| 29 | 1-Aminobenzene-2,5-disulfonic acid → 1-Amino-2-methoxy-5-methyl-benzene | 1-Amino-8-hydroxy-naphthalene-3,6-disulfonic acid | 2,4,6-Trichloro-s-triazine | $H_2N$–⟨phenyl(meta)⟩–$CONHCH_2CH_2SO_2CH_2CH_2Cl$ |
| 30 | 1-Aminobenzene-2,5-disulfonic acid → 1-Amino-2-methoxy-5-methylbenzene | 1-Amino-8-hydroxy-naphthalene-3,6-disulfonic acid | 4-($\beta$-Chloroethyl-sulfonyl)-butyryl chloride | — |
| 31 | 1-Aminobenzene-2,5-disulfonic acid → 1-Amino-2-methoxy-5-methylbenzene | 1-Amino-8-hydroxy-naphthalene-3,6-disulfonic acid | $\alpha,\beta$-Dibromopropionyl chloride | — |
| 32 | 1-Aminobenzene-2,5-disulfonic acid → 1-Amino-2-methoxy-5-methylbenzene | 1-Amino-8-hydroxy-naphthalene-3,6-disulfonic acid | 2,4,6-Trifluoro-5-chloropyrimidine | — |
| 33 | 1-Aminobenzene-2,5-disulfonic acid → 1-Amino-2-methoxy-5-methylbenzene | 1-Amino-8-hydroxy-naphthalene-3,6-disulfonic acid | 2,4-Dichloro-6-iso-propoxy-s-triazine | — |
| 34 | 1-Aminobenzene-2,5-disulfonic acid → 1-Amino-2-methoxy-5-methylbenzene | 1-Amino-8-hydroxy-naphthalene-4,6-disulfonic acid | 2,4,6-Trichloro-s-triazine | $H_2NCH_2CH_2OCH_2CH_2SO_2CH_2CH_2Cl$ |
| 35 | 1-Aminobenzene-2,5-disulfonic acid → 1-Amino-2-ethoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 36 | 1-Aminobenzene-2,5-disulfonic acid → 1-Amino-2,5-dimethoxybenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 37 | 1-Aminobenzene-2,5-disulfonic acid → 1-Amino-2-methoxy-5-acetyl-aminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 38 | 1-Aminobenzene-2,5-disulfonic acid → 2-Methoxy-1-naphthylamine-6-sulfonic acid | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 39 | 1-Aminobenzene-2,4-disulfonic acid | 1-Amino-8-hydroxy- | 2,4,6-Trichloro-s- | $H_2NCH_2CH_2OCH_2CH_2SO_2CH_2CH_2Cl$ |

TABLE 1-continued

| No. | Monoazo dye | Coupling component | Reactive component | Amine |
|---|---|---|---|---|
|  | → 1-Amino-2-methoxy-5-methyl-benzene | naphthalene-3,6-disulfonic acid | triazine |  |
| 40 | 1-Aminobenzene-2,4-disulfonic acid → 1-Amino-2-methoxy-5-methyl-benzene | 1-Amino-8-hydroxy-naphthalene-3,6-disulfonic acid | 2,4,6-Trichloro-s-triazine | $H_2NCH_2CH_2SO_2CH_2CH_2Cl$ |
| 41 | 1-Aminobenzene-2,4-disulfonic acid → 1-Amino-2-methoxy-5-methyl-benzene | 1-Amino-8-hydroxy-naphthalene-3,6-disulfonic acid | 2,4,6-Trichloro-s-triazine | $HN(CH_2CH_2SO_2CH_2CH_2Cl)_2$ |
| 42 | 1-Aminobenzene-2,4-disulfonic acid → 1-Amino-2-methoxy-5-methyl-benzene | 1-Amino-8-hydroxy-naphthalene-3,6-disulfonic acid | 2,4,6-Trichloro-s-triazine | $H_2N-\underset{}{\bigcirc}-CONHCH_2CH_2SO_2CH_2CH_2Cl$ (pyridine ring) |
| 43 | 1-Amino-2,4-disulfonic acid → 1-Amino-2-methoxy-5-methyl-benzene | 1-Amino-8-hydroxy-naphthalene-3,6-disulfonic acid | 2,4,6-Trichloro-s-triazine | $H_2N-\underset{}{\bigcirc}-CONHCH_2CH_2SO_2CH_2CH_2Cl$ (pyridine ring) |
| 44 | 1-Aminobenzene-2,4-disulfonic acid → 1-Amino-2-methoxy-5-methyl-benzene | 1-Amino-8-hydroxy-naphthalene-3,6-disulfonic acid | 4-($\beta$-Chloroethyl-sulfonyl)-butyryl chloride | — |
| 45 | 1-Aminobenzene-2,4-disulfonic acid → 1-Amino-2-methoxy-5-methyl-benzene | 1-Amino-8-hydroxy-naphthalene-3,6-disulfonic acid | $\alpha,\beta$-Dibromopropionyl chloride | — |
| 46 | 1-Aminobenzene-2,4-disulfonic acid → 1-Amino-2-methoxy-5-methyl-benzene | 1-Amino-8-hydroxy-naphthalene-3,6-disulfonic acid | 2,4,6-Trifluoro-5-chloro-pyrimidine | — |
| 47 | 1-Aminobenzene-2,4-disulfonic acid → 1-Amino-2,5-dimethoxybenzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 48 | 1-Aminobenzene-2,4-disulfonic acid → 1-Amino-2-methoxy-5-acetyl-aminobenzene | 1-Amino-8-hydroxy-naphthalene-3,6-disulfonic acid | 2,4,6-Trichloro-s-triazine | $NH_2CH_2CH_2SO_2CH_2CH_2Cl$ |
| 49 | 1-Aminobenzene-2,4-disulfonic acid → 1-Amino-2-methoxy-5-sulfo-acetylaminobenzene | 1-Amino-8-hydroxy-naphthalene-3,6-disulfonic acid | 2,4,6-Trichloro-s-triazine | $NH_2CH_2CH_2SO_2CH_2CH_2Cl$ |
| 50 | 2-Naphthylaminene-1,5-disulfonic acid → 1-Amino-2-methoxy-5-methyl-benzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 51 | 2-Naphthylamine-4,8-disulfonic acid → 1-Amino-2-methoxy-5-methyl-benzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 52 | 2-Naphthylamine-4,8-disulfonic acid → 1-Amino-2-methoxy-5-methyl-benzene | 1-Amino-8-hydroxy-naphthalene-3,6-disulfonic acid | 4-($\beta$-Chloroethyl-sulfonyl)-butyryl chloride | — |
| 53 | 2-Naphthylamine-4,8-disulfonic acid → 1-Amino-2-methoxy-5-acetyl-aminobenzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 54 | 2-Naphthylamine-4,8-disulfonic acid → 1-Amino-2-ethoxy-5-acetyl-aminobenzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 55 | 2-Naphthylamine-4,8-disulfonic acid → 1-Amino-2-methoxy-5-sulfo-acetylaminobenzene | 1-Amino-8-hydroxy-naphthalene-3,6-disulfonic acid | 2,4,6-Trichloro-s-triazine | $NH_2CH_2CH_2SO_2CH_2CH_2Cl$ |
| 56 | 2-Naphthylamine-4,8-disulfonic acid → 1-Amino-2-methoxy-5-sulfo-acetylaminobenzene | 1-Amino-8-hydroxy-naphthalene-3,6-disulfonic acid | $\alpha,\beta$-Dibromo-propionyl chloride | — |
| 57 | 2-Naphthylamine-5,7-disulfonic acid → 1-Amino-2-methoxy-5-methyl-benzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 58 | 2-Naphthylamine-3,6-disulfonic acid → 1-Amino-2-methoxy-5-methyl-benzene | 1-Amino-8-hydroxy-naphthalene-3,6-disulfonic acid | 2,4,6-Trichloro-s-triazine | $NH_2CH_2OCH_2CH_2SO_2CH_2CH_2Cl$ |
| 59 | 2-Naphthylamine-3,6-disulfonic acid → 1-Amino-2-methoxy-5-acetyl aminobenzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 60 | 2-Naphthylamine-3,6-disulfonic acid → 1-Amino-2-methoxy-5-acetyl-aminobenzene | 1-Amino-8-hydroxy-naphthalene-3,6-disulfonic acid | 2,4,6-Trichloro-s-triazine | $NH_2CH_2CH_2SO_2CH_2CH_2Cl$ |
| 61 | 2-Naphthylamine-3,6-disulfonic acid | 1-Amino-8-hydroxy- | 2,4,6-Trichloro-s- | $NH_2CH_2CH_2OCH_2CH_2SO_2CH_2CH_2Cl$ |

TABLE 1-continued

| No. | Monoazo dye | Coupling component | Reactive component | Amine |
|---|---|---|---|---|
|  | → 1-Amino-2-methoxy-5-sulfo-acetylaminobenzene | naphthalene-3,6-disulfonic acid | triazine |  |
| 62 | 2-Naphthylamine-3,6-disulfonic acid → 1-Amino-2-methoxy-5-sulfo-acetylaminobenzene | 1-Amino-8-hydroxy-naphthalene-4,6-disulfonic acid | 4-($\beta$-Chloroethyl-sulfonyl)-butyryl chloride | — |
| 63 | 2-Naphthylamine-6,8-disulfonic acid → 1-Amino-2-methoxy-5-methyl-benzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 64 | 2-Naphthylamine-6,8-disulfonic acid → 1-Amino-2-methoxy-5-acetyl-aminobenzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 65 | 2-Naphthylamine-6,8-disulfonic acid → 1-Amino-2-methoxy-5-sulfo-acetylaminobenzene | 1-Amino-8-hydroxy-naphthalene-3,6-disulfonic acid | 2,4,6-Trichloro-s-triazine | $NH_2CH_2CH_2SO_2CH_2CH_2Cl$ |
| 66 | 2-Naphthylamine-6,8-disulfonic acid → 1-Amino-2-methoxy-5-sulfo-acetylaminobenzene | 1-Amino-8-hydroxy-naphthalene-3,6-disulfonic acid | 4-($\beta$-Chloroethyl-sulfonyl)-butyryl chloride | — |
| 67 | 2-Naphthylamine-3,6,8-trisulfonic acid → 1-Amino-2-methoxy-5-methybenzene | 1-Amino-8-hydroxy-naphthalene-3,6-disulfonic acid | 2,4,6-Trichloro-s-triazine | $NH_2CH_2CH_2OCH_2CH_2SO_2CH_2CH_2Cl$ |
| 68 | 2-Naphthylamine-3,6,8-trisulfonic acid → 1-Amino-2-methoxy-5-methylbenzene | 1-Amino-8-hydroxy-naphthalene-3,6-disulfonic acid | 2,4,6-Trichloro-s-triazine | $HN(CH_2CH_2SO_2CH_2CH_2Cl)_2$ |
| 69 | 2-Naphthylamine-3,6,8-trisulfonic acid → 1-Amino-2-methoxy-5-methylbenzene | 1-Amino-8-hydroxy-naphthalene-3,6-disulfonic acid | 2,4,6-Trichloro-s-triazine | 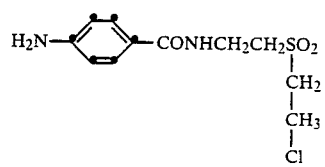 |
| 70 | 2-Naphthylamine-3,6,8-trisulfonic acid → 1-Amino-2-methoxy-5-methylbenzene | 1-Amino-8-hydroxy-naphthalene-3,6-disulfonic acid | 4-($\beta$-Chloroethyl-sulfonyl)-butyryl chloride | — |
| 71 | 2-Naphthylamine-3,6,8-trisulfonic acid → 1-Amino-2,5-dimethoxy-benzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 72 | 2-Naphthylamine-3,6,8-trisulfonic acid → 1-Amino-2-methoxy-5-acetylaminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 73 | 2-Naphthylamine-3,6,8-trisulfonic acid → 1-Amino-2-ethoxy-5-acetylaminobenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 74 | 2-Naphthylamine-3,6,8-trisulfonic acid → 1-Amino-2-methoxy-5-sulfoacetylaminobenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 75 | 2-Naphthylamine-3,6,8-trisulfonic acid → 1-Amino-2-methoxy-5-sulfoacetylaminobenzene | 1-Amino-8-hydroxy-naphthalene-4,6-disulfonic acid | 2,4-Dichloro-iso-propoxy-s-triazine | — |
| 76 | 2-Naphthylamine-3,6,8-trisulfonic acid → 1-Amino-2-methoxy-5-sulfoacetylaminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 77 | 2-Naphthylamine-4,6,8-trisulfonic acid → 1-Amino-2-methoxy-5-methylbenzene | 1-Amino-8-hydroxy naphthalene-3,6-disulfonic acid | 2,4,6-Trichloro-s-triazine | $H_2NCH_2CH_2OCH_2CH_2SO_2CH_2CH_2Cl$ |
| 78 | 2-Naphthylamine-4,6,8-trisulfonic acid → 1-Amino-2-methoxy-5-methylbenzene | 1-Amino-8-hydroxy-naphthalene-3,6-disulfonic acid | 2,4,6-Trichloro-s-triazine | $H_2NCH_2CH_2SO_2CH_2CH_2Cl$ |
| 79 | 2-Naphthylamine-4,6,8-trisulfonic acid → 1-Amino-2-methoxy-5-methylbenzene | 1-Amino-8-hydroxy naphthalene-3,6-disulfonic acid | 2,4,6-Trichloro-s-triazine | 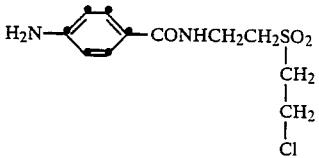 |
| 80 | 2-Naphthylamine-4,6,8-trisulfonic acid → 1-Amino-2-methoxy-5-methylbenzene | 1-Amino-8-hydroxy-naphthalene-3,6-disulfonic acid | 2,4,6-Trichloro-s-triazine | 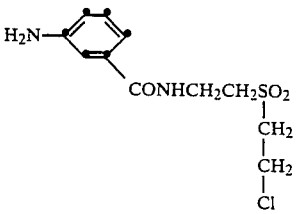 |

TABLE 1-continued

| No. | Monoazo dye | Coupling component | Reactive component | Amine |
|---|---|---|---|---|
| 81 | 2-Naphthylamine-4,6,8-trisulfonic acid → 1-Amino-2-methoxy-5-methylbenzene | 1-Amino-8-hydroxy-naphthalene-3,6-disulfonic acid | 2,4,6-Trichloro-s-triazine | 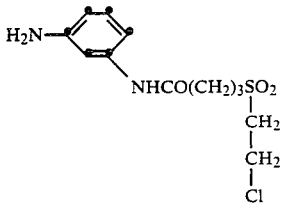 |
| 82 | 2-Naphthylamine-4,6,8-trisulfonic acid → 1-Amino-2-methoxy-5-methylbenzene | 1-Amino-8-hydroxy-naphthalene-3,6-disulfonic acid | 4-($\beta$-Chloroethyl-sulfonyl)-butyryl chloride | — |
| 83 | 2-Naphthylamine-4,6,8-trisulfonic acid → 1-Amino-2-methoxy-5-methylbenzene | 1-Amino-8-hydroxy-naphthalene-3,6-disulfonic acid | $\alpha,\beta$-Dibromo-propionyl chloride | — |
| 84 | 2-Naphthylamine-4,6,8-trisulfonic acid → 1-Amino-2-methoxy-5-methylbenzene | 1-Amino-8-hydroxy-naphthalene-3,6-disulfonic acid | 2,4,6-Trifluoro-5-chloro-pyrimidine | — |
| 85 | 2-Naphthylamine-4,6,8-trisulfonic acid → 1-Amino-2,5-dimethoxy-benzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 86 | 2-Naphthylamine-4,6,8-trisulfonic acid → 1-Amino-2-methoxy-5-acetylaminobenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 87 | 2-Naphthylamine-4,6,8-trisulfonic acid → 1-Amino-2-athoxy-5-methylbenzene | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |

EXAMPLE 2

15.9 g of 1-amino-8-hydroxynaphthalene-3,6-disulfonic acid are dissolved in 300 ml of water at a pH of 5.5, and 4 g of sodium chloride are added. The solution is cooled down to 0° to 2° C., and 7.5 g of trifluorotriazine are then added dropwise with thorough stirring in the course of 2 minutes. The addition of 20 ml of 2N hydrochloric acid is followed by 10 minutes of stirring. 16.4 g of 4-amino-N'-$\beta$-($\beta$'-chloroethylsulfonyl)-ethyl-benzamide hydrochloride in 100 ml of water are then added to the solution, the pH is maintained at 5.5 and the temperature is allowed to rise to 20° C.

20 g 4-amino-3-methoxy-6-methyl-2', 5'-disulfo-1,1'-azobenzene are diazotized analogously to Example 1. At 20° C. the diazo compound is then added to the above-prepared solution of the reactive coupling component and in the coupling mixture the pH is maintained at 6.5 with 20% sodium carbonate solution. After one hour of stirring the dye is salted out with potassium chloride, filtered off with suction, washed and dried at 40° C. in vacuo.

The dye which, in the form of free acid, has the formula

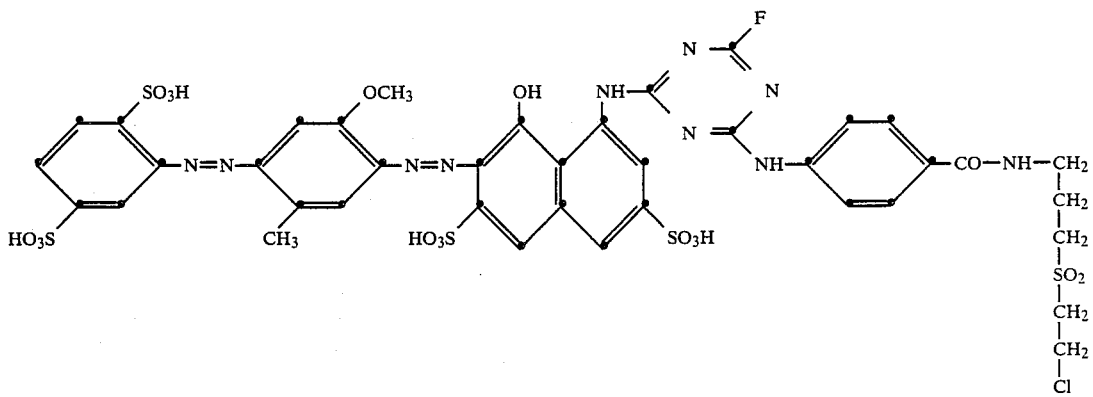

dyes cotton in blue shades having good fastness properties.

Further dyes are listed in Table 2.

In both Example 1 and Example 2, the preparation of the dyes listed in the tables below is not restricted to the method of preparation described in the respective example. Depending on the structure, solubility and other parameters, it can be more favourable in a particular case first to couple onto the primary condensation product of H acid and halotriazine and thereafter to carry out the condensation with the amine and in another case to proceed in accordance with Example 2.

TABLE 2

| No. | Monoazo dye | Coupling component | Reactive component | Amine |
|---|---|---|---|---|
| 1 | 1-Aminobenzene-2,5-disulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\underset{\underset{\underset{\underset{Cl}{CH_2}}{CH_2}}{CH_2}}{\bigcirc}-CONHCH_2CH_2SO_2$ |
| 2 | 1-Aminobenzene-2,5-disulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\bigcirc-NHCO(CH_2)_3SO_2-CH_2-CH_2-Cl$ |
| 3 | 1-Aminobenzene-2,5-disulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\bigcirc-NHCO(CH_2)_3SO_2-CH_2-CH_2-Cl$ |
| 4 | 1-Aminobenzene-2,5-disulfonic acid →1-Amino-2-methoxy-5-methyl-benzene | 1-Amino-8-hydroxy-naphthalene-3,6-disulfonic acid | 2,4,6-Trifluoro-s-triazine | 1-Amino-4-chlorobenzene |
| 5 | 1-Aminobenzene-2,5-disulfonic acid →1-Amino-2-methoxy-5-methyl-benzene | 1-Amino-8-hydroxy-naphthalene-3,6-disulfonic acid | 2,4-Difluoro-6-methoxy-s-triazine | — |
| 6 | 1-Aminobenzene-2,5-disulfonic acid →1-Amino-2-methoxy-5-methyl-benzene | 1-Amino-8-hydroxy-naphthalene-3,6-disulfonic acid | 2,4,6-Trifluoro-pyrimidine | — |
| 7 | 1-Aminobenzene-2,5-disulfonic acid →1-Amino-2-methoxy-5-acetyl-aminobenzene | 1-Amino-8-hydroxy-naphthalene-3,6-disulfonic acid | 2,4,6-Trichloro-s-triazine | $H_2N-\bigcirc-CONHCH_2CH_2SO_2-CH_2-CH_2-Cl$ |
| 8 | 1-Aminobenzene-2,5-disulfonic acid →1-Amino-2-methoxy-5-sulfo-acetylaminobenzene | 1-Amino-8-hydroxy-naphthalene-3,6-disulfonic acid | 2,4,6-Trichloro-s-triazine | $H_2N-\bigcirc-CONHCH_2CH_2SO_2-CH_2-CH_2-Cl$ |
| 9 | 1-Aminobenzene-2,5-disulfonic acid →1-Amino-2-methoxy-5-sulfo-acetylaminobenzene | 1-Amino-8-hydroxy-naphthalene-3,6-disulfonic acid | 2,4,6-Trichloro-s-triazine | $H_2N-\bigcirc-CONHCH_2CH_2SO_2-CH_2-CH_2-Cl$ |
| 10 | 1-Aminobenzene-2,4-disulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\bigcirc-CONHCH_2CH_2SO_2-CH_2-CH_2-Cl$ |

TABLE 2-continued

| No. | Monoazo dye | Coupling component | Reactive component | Amine |
|-----|-------------|-------------------|--------------------|-------|
| 11 | 1-Aminobenzene-2,4-disulfonic acid →1-Amino-2-methoxy-5-methyl benzene | 1-Amino-8-hydroxy-naphthalene-3,6-disulfonic acid | 2,4,6-Trifluoro-s-triazine | 1-Amino-2-methylbenzene |
| 12 | 1-Aminobenzene-2,4-disulfonic acid →1-Amino-2-methoxy-5-methyl-benzene | 1-Amino-8-hydroxy-naphthalene-3,6-disulfonic acid | 2,4,6-Trifluoro-s-triazine | 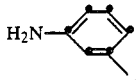 |
| 13 | 1-Aminobenzene-2,4-disulfonic acid →1-Amino-2-methoxy-5-methyl-benzene | 1-Amino-8-hydroxy-naphthalene-3,6-disulfonic acid | 2,4-Difluoro-6-iso-propoxy-s-triazine | — |
| 14 | 1-Aminobenzene-2,4-disulfonic acid →1-Amino-2-methoxy-5-acetyl-aminobenzene | 1-Amino-8-hydroxy-naphthalene-3,6-disulfonic acid | 2,4,6-Trichloro-s-triazine | 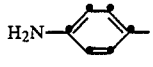 |
| 15 | 1-Aminobenzene-2,4-disulfonic acid →1-Amino-2-ethoxy-5-acetyl-aminobenzene | 1-Amino-8-hydroxy-naphthalene-3,6-disulfonic acid | 2,4,6-Trichloro-s-triazine | 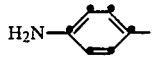 |
| 16 | 1-Aminobenzene-2,4-disulfonic acid →1-Amino-2-ethoxy-5-acetyl-aminobenzene | 1-Amino-8-hydroxy-naphthalene-4,6-disulfonic acid | 2,4,6-Trifluoro-s-triazine | 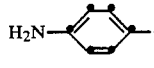 |
| 17 | 2-Naphthylamine-1,5-disulfonic acid →1-Amino-2-methoxy-5-acetyl-aminobenzene | 1-Amino-8-hydroxy-naphthalene-3,6-disulfonic acid | 2,4,6-Trifluoro-s-triazine | 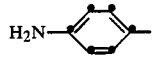 |
| 18 | 2-Naphthylamine-4,8-disulfonic acid →1-Amino-2-methoxy-5-methyl-benzene | 1-Amino-8-hydroxy-naphthalene-3,6-disulfonic acid | 2,4,6-Trifluoro-s-triazine | 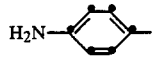 |
| 19 | 2-Naphthylamine-4,8-disulfonic acid →1-Amino-2-methoxy-5-methyl-benzene | 1-Amino-8-hydroxy-naphthalene-3,6-disulfonic acid | 2,4,6-Trifluoro-s-triazine | 1-Amino-2-methylbenzene |
| 20 | 2-Naphthylamine-4,8-disulfonic acid →1-Amino-2-methoxy-5-methyl-benzene | 1-Amino-8-hydroxy-naphthalene-3,6-disulfonic acid | 2,4,6-Trichloro-s-triazine | 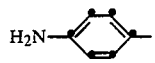 |

TABLE 2-continued

| No. | Monoazo dye | Coupling component | Reactive component | Amine |
|---|---|---|---|---|
| 21 | 2-Naphthylamine-4,8-disulfonic acid →1-Amino-2-methoxy-5-acetyl-aminobenzene | 1-Amino-8-hydroxy-naphthalene-3,6-disulfonic acid | 2,4,6-Trichloro-s-triazine | H$_2$N—⟨⟩—CONHCH$_2$CH$_2$SO$_2$—CH$_2$—CH$_2$—Cl |
| 22 | 2-Naphthylamine-4,8-disulfonic acid →1-Amino-2-methoxy-5-acetyl-aminobenzene | 1-Amino-8-hydroxy-naphthalene-3,6-disulfonic acid | 2,4,6-Trichloro-s-triazine | H$_2$N—⟨⟩—CONHCH$_2$CH$_2$SO$_2$—CH$_2$—CH$_2$—Cl |
| 23 | 2-Naphthylamine-4,8-disulfonic acid →1-Amino-2-methoxy-5-acetyl-aminobenzene | 1-Amino-8-hydroxy-naphthalene-3,6-disulfonic acid | 2,4,6-Trifluoro-s-triazine | H$_2$N—⟨⟩—CONHCH$_2$CH$_2$SO$_2$—CH$_2$—CH$_2$—Cl |
| 24 | 2-Naphthylamine-4,8-disulfonic acid →1-Amino-2-methoxy-5-acetyl-aminobenzene | 1-Amino-8-hydroxy-naphthalene-3,6-disulfonic acid | 2,4,6-Trifluoro-s-triazine | 1-Amino-3-chlorobenzene |
| 25 | 2-Naphthylamine-4,8-disulfonic acid →1-Amino-2-methoxy-5-acetyl-aminobenzene | 1-Amino-8-hydroxy-naphthalene-3,6-disulfonic acid | 2,4,6-Trifluoro-s-triazine | H$_2$N—⟨⟩—CONHCH$_2$CH$_2$SO$_2$—CH$_2$—CH$_2$—Cl |
| 26 | 2-Naphthylamine-5,7-disulfonic acid →1-Amino-2-methoxy-5-methyl-benzene | 1-Amino-8-hydroxy-naphthalene-3,6-disulfonic acid | 2,4,6-Trifluoro-s-triazine | H$_2$N—⟨⟩—CONHCH$_2$CH$_2$SO$_2$—CH$_2$—CH$_2$—Cl |
| 27 | 2-Naphthylamine-3,6-disulfonic acid →1-Amino-2-methoxy-5-methyl-benzene | 1-Amino-8-hydroxy-naphthylene-3,6-disulfonic acid | 2,4,6-Trifluoro-s-triazine | H$_2$N—⟨⟩—CONHCH$_2$CH$_2$SO$_2$—CH$_2$—CH$_2$—Cl |
| 28 | 2-Naphthylamine-3,6-disulfonic acid →1-Amino-2-methoxy-5-methyl-benzene | 1-Amino-8-hydroxy-naphthalene-3,6-disulfonic acid | 2,4,6-Trichloro-s-triazine | H$_2$N—⟨⟩—CONHCH$_2$CH$_2$SO$_2$—CH$_2$—CH$_2$—Cl |
| 29 | 2-Naphthylamine-3,6-disulfonic acid →1-Amino-2-methoxy-5-acetyl-aminobenzene | 1-Amino-8-hydroxy-naphthalene-3,6-disulfonic acid | 2,4,6-Trichloro-s-triazine | H$_2$N—⟨⟩—CONHCH$_2$CH$_2$SO$_2$—CH$_2$—CH$_2$—Cl |

TABLE 2-continued

| No. | Monoazo dye | Coupling component | Reactive component | Amine |
|---|---|---|---|---|
| 30 | 2-Naphthylamine-3,6-disulfonic acid →1-Amino-2-methoxy-5-acetyl-aminobenzene | 1-Amino-8-hydroxy-naphthalene-3,6-disulfonic acid | 2,4,6-Trifluoro-s-triazine | $H_2N-\langle\text{ring}\rangle-CONHCH_2CH_2SO_2-CH_2-CH_2-Cl$ |
| 31 | 2-Naphthylamine-6,8-disulfonic acid →1-Amino-2-methoxy-5-methyl-benzene | 1-amino-8-hydroxy-naphthalene-3,6-disulfonic acid | 2,4,6-Trifluoro-s-triazine | $H_2N-\langle\text{ring}\rangle-CONHCH_2CH_2SO_2-CH_2-CH_2-Cl$ |
| 32 | 2-Naphthylamine-6,8-disulfonic acid →1-Amino-2-methoxy-5-methyl-benzene | 1-Amino-8-hydroxy-naphthalene-3,6-disulfonic acid | 2,4,6-Trifluoro-s-triazine | N—Ethylaminobenzene |
| 33 | 2-Naphthylamine-6,8-disulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\langle\text{ring}\rangle-CONHCH_2CH_2SO_2-CH_2-CH_2-Cl$ |
| 34 | 2-Naphthylamine-6,8-disulfonic acid →1-Amino-2-methoxy-5-acetyl-aminobenzene | 1-Amino-8-hydroxy-naphthalene-3,6-disulfonic acid | 2,4,6-Trifluoro-s-triazine | $H_2N-\langle\text{ring}\rangle-CONHCH_2CH_2SO_2-CH_2-CH_2-Cl$ |
| 35 | 2-Naphthylamine-6,8-disulfonic acid →1-Amino-2-methoxy-5-acetyl-aminobenzene | 1-Amino-8-hydroxy-naphthalene-3,6-disulfonic acid | 2,4,6-Trichloro-s-triazine | $H_2N-\langle\text{ring}\rangle-CONHCH_2CH_2SO_2-CH_2-CH_2-Cl$ |
| 36 | 2-Naphthylamine-6,8-disulfonic acid →1-Amino-2-methoxy-5-sulfo-acetylaminobenzene | 1-Amino-8-hydroxy-naphthalene-3,6-disulfonic acid | 2,4,6-Trichloro-s-triazine | $H_2N-\langle\text{ring}\rangle-CONHCH_2CH_2SO_2-CH_2-CH_2-Cl$ |
| 37 | 2-Naphthylamine-6,8-disulfonic acid →1-Amino-2-methoxy-5-sulfo-acetylaminobenzene | 1-Amino-8-hydroxy-naphthalene-3,6-disulfonic acid | 2,4,6-Trichloro-s-triazine | $H_2N-\langle\text{ring}\rangle-CONHCH_2CH_2SO_2-CH_2-CH_2-Cl$ |

TABLE 2-continued

| No. | Monoazo dye | Coupling component | Reactive component | Amine |
|---|---|---|---|---|
| 38 | 2-Naphthylamine-6,8-disulfonic acid →1-Amino-2-methoxy-5-sulfo-acetylaminobenzene | 1-Amino-8-hydroxy-naphthalene-3,6-disulfonic acid | 2,4,6-Trifluoro-s-triazine | $H_2N-\langle\rangle-CONHCH_2CH_2SO_2-CH_2-CH_2-Cl$ |
| 39 | 2-Naphthylamine-6,8-disulfonic acid →1-Amino-2-methoxy-5-sulfo-acetylaminobenzene | 1-Amino-8-hydroxy-naphthalene-3,6-disulfonic acid | 2,4,6-Trifluoro-s-triazine | N—(2-Hydroxyethyl)-aminobenzene |
| 40 | 2-Naphthylamine-3,6,8-trisulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\langle\rangle-CONHCH_2CH_2SO_2-CH_2-CH_2-Cl$ |
| 41 | 2-Naphthylamine-3,6,8-trisulfonic acid →1-Amino-2-methoxy-5-methyl-benzene | 1-Amino-8-hydroxy-naphthalene-3,6-disulfonic acid | 2,4,6-Trifluoro-s-triazine | 1-Amino-2-methylbenzene |
| 42 | 2-Naphthylamine-3,6,8-trisulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\langle\rangle-CONHCH_2CH_2SO_2-CH_2-CH_2-Cl$ |
| 43 | 2-Naphthylamine-3,6,8-trisulfonic acid →1-Amino-2-methoxy-5-methyl-benzene | 1-Amino-8-hydroxy-naphthalene-4,6-disulfonic acid | 2,4,6-Trifluoro-s-triazine | $H_2N-\langle\rangle-CONHCH_2CH_2SO_2-CH_2-CH_2-Cl$ |
| 44 | 2-Naphthylamine-3,6,8-trisulfonic acid →1-Amino-2-methoxy-5-methyl-benzene | 1-Amino-8-hydroxy-naphthalene-3,6-disulfonic acid | 2,4,6-Trichloro-s-triazine | $H_2N-\langle\rangle-CONHCH_2CH_2SO_2-CH_2-CH_2-Cl$ |
| 45 | 2-Naphthylamine-3,6,8-trisulfonic acid →1-Amino-2,5-dimethoxy-benzene | 1-Amino-8-hydroxy-naphthalene-3,6-disulfonic acid | 2,4,6-Trifluoro-s-triazine | $H_2N-\langle\rangle-CONHCH_2CH_2SO_2-CH_2-CH_2-Cl$ |

TABLE 2-continued

| No. | Monoazo dye | Coupling component | Reactive component | Amine |
|---|---|---|---|---|
| 46 | 2-Naphthylamine-3,6,8-trisulfonic acid →1-Amino-2-methoxy-5-acetyl-aminobenzene | 1-Amino-8-hydroxy-naphthalene-3,6-disulfonic acid | 2,4,6-Trifluoro-s-triazine | $H_2N-\langle\!\!\!\bigcirc\!\!\!\rangle-CONHCH_2CH_2SO_2-CH_2-CH_2-Cl$ (para) |
| 47 | 2-Naphthylamine-3,6,8-trisulfonic acid →1-Amino-2-methoxy-5-acetyl-aminobenzene | 1-Amino-8-hydroxy-naphthalene-3,6-disulfonic acid | 2,4,6-Trifluoro-s-triazine | 1-Amino-4-chlorobenzene |
| 48 | 2-Naphthylamine-3,6,8-trisulfonic acid →1-Amino-2-methoxy-5-acetyl-aminobenzene | 1-Amino-8-hydroxy-naphthalene-3,6-disulfonic acid | 2,4,6-Trifluoro-s-triazine | $H_2N-\langle\!\!\!\bigcirc\!\!\!\rangle-CONHCH_2CH_2SO_2-CH_2-CH_2-Cl$ |
| 49 | 2-Naphthylamine-3,6,8-trisulfonic acid →1-Amino-2-methoxy-5-acetyl-aminobenzene | 1-Amino-8-hydroxy-naphthalene-3,6-disulfonic acid | 2,4,6-Trichloro-s-triazine | $H_2N-\langle\!\!\!\bigcirc\!\!\!\rangle-CONHCH_2CH_2SO_2-CH_2-CH_2-Cl$ |
| 50 | 2-Naphthylamine-3,6,8-trisulfonic acid →1-Amino-2-methoxy-5-acetyl-aminobenzene | 1-Amino-8-hydroxy-naphthalene-3,6-disulfonic acid | 2,4,6-Trichloro-s-triazine | $H_2N-\langle\!\!\!\bigcirc\!\!\!\rangle-CONHCH_2CH_2SO_2-CH_2-CH_2-Cl$ (para) |
| 51 | 2-Naphthylamine-3,6,8-trisulfonic acid →1-Amino-2-methoxy-5-sulfo-acetylaminobenzene | 1-Amino-8-hydroxy-naphthalene-3,6-disulfonic acid | 2,4,6-Trifluoro-s-triazine | $H_2N-\langle\!\!\!\bigcirc\!\!\!\rangle-CONHCH_2CH_2SO_2-CH_2-CH_2-Cl$ (para) |
| 52 | 2-Naphthylamine-3,6,8-trisulfonic acid →1-Amino-2-methoxy-5-sulfo-acetylaminobenzene | 1-Amino-8-hydroxy-naphthalene-3,6-disulfonic acid | 2,4,6-Trifluoro-s-triazine | $H_2N-\langle\!\!\!\bigcirc\!\!\!\rangle-CONHCH_2CH_2SO_2-CH_2-CH_2-Cl$ |
| 53 | 2-Naphthylamine-4,6,8-trisulfonic acid →1-Amino-2-methoxy-5-methyl-benzene | 1-Amino-8-hydroxy-naphthalene-3,6-disulfonic acid | 2,4,6-Trifluoro-s-triazine | $H_2N-\langle\!\!\!\bigcirc\!\!\!\rangle-CONHCH_2CH_2SO_2-CH_2-CH_2-Cl$ |
| 54 | 2-Naphthylamine-4,6,8-trisulfonic acid →1-Amino-2-methoxy-5-methyl-benzene | 1-Amino-8-hydroxy-naphthalene-3,6-disulfonic acid | 2,4,6-Trifluoro-s-triazine | 1-Amino-3-chlorobenzene |

TABLE 2-continued

| No. | Monoazo dye | Coupling component | Reactive component | Amine |
|---|---|---|---|---|
| 55 | 2-Naphthylamine-4,6,8-trisulfonic acid →1-Amino-2-methoxy-5-methyl-benzene | 1-Amino-8-hydroxy-naphthalene-3,6-disulfonic acid | 2,4,6-Trifluoro-s-triazine | $H_2N$—⟨benzene⟩ with CONHCH$_2$CH$_2$SO$_2$—CH$_2$—CH$_2$—Cl |
| 56 | 2-Naphthylamine-4,6,8-trisulfonic acid →1-Amino-2,5-dimethoxy-benzene | 1-Amino-8-hydroxy-naphthalene-3,6-disulfonic acid | 2,4,6-Trifluoro-s-triazine | $H_2N$—⟨benzene⟩ with CONHCH$_2$CH$_2$SO$_2$—CH$_2$—CH$_2$—Cl |
| 57 | 2-Naphthylamine-4,6,8-trisulfonic acid →1-Amino-2,5-dimethoxy-benzene | 1-Amino-8-hydroxy-naphthalene-3,6-disulfonic acid | 2,4,6-Trichloro-s-triazine | $H_2N$—⟨benzene⟩ with CONHCH$_2$CH$_2$SO$_2$—CH$_2$—CH$_2$—Cl |
| 58 | 2-Naphthylamine-4,6,8-trisulfonic acid →1-Amino-2,5-dimethoxy-benzene | 1-Amino-8-hydroxy-naphthalene-3,6-disulfonic acid | 2,4,6-Trichloro-s-triazine | $H_2N$—⟨benzene⟩—CONHCH$_2$CH$_2$SO$_2$—CH$_2$—CH$_2$—Cl |
| 59 | 2-Naphthylamine-4,6,8-trisulfonic acid →1-Amino-2-methoxy-5-acetyl-aminobenzene | 1-Amino-8-hydroxy-naphthalene-3,6-disulfonic acid | 2,4,6-Trifluoro-s-triazine | $H_2N$—⟨benzene⟩—CONHCH$_2$CH$_2$SO$_2$—CH$_2$—CH$_2$—Cl |
| 60 | 2-Naphthylamine-4,6,8-trisulfonic acid →1-Amino-2-methoxy-5-acetyl-aminobenzene | 1-Amino-8-hydroxy-naphthalene-3,6-disulfonic acid | 2,4,6-Trifluoro-s-triazine | $H_2N$—⟨benzene⟩ with CONHCH$_2$CH$_2$SO$_2$—CH$_2$—CH$_2$—Cl |
| 61 | 2-Naphthylamine-4,6,8-trisulfonic acid →1-Amino-2-methoxy-5-acetyl-aminobenzene | 1-Amino-8-hydroxy-naphthalene-3,6-disulfonic acid | 2,4,6-Trichloro-s-triazine | $H_2N$—⟨benzene⟩ with CONHCH$_2$CH$_2$SO$_2$—CH$_2$—CH$_2$—Cl |

TABLE 2-continued

| No. | Monoazo dye | Coupling component | Reactive component | Amine |
|-----|-------------|--------------------|--------------------|-------|
| 62 | 2-Naphthylamine-4,6,8-trisulfonic acid →1-Amino-2-methoxy-5-sulfo-acetylaminobenzene | 1-Amino-8-hydroxy-naphthalene-3,6-disulfonic acid | 2,4,6-Trichloro-s-triazine | $H_2N-$⟨⟩$-$ (ortho) $CONHCH_2CH_2SO_2-CH_2-CH_2-Cl$ |
| 63 | 2-Naphthylamine-4,6,8-trisulfonic acid →1-Amino-2-methoxy-5-sulfo-acetylaminobenzene | 1-Amino-8-hydroxy-naphthalene-3,6-disulfonic acid | 2,4,6-Trichloro-s-triazine | $H_2N-$⟨⟩$-CONHCH_2CH_2SO_2-CH_2-CH_2-Cl$ |
| 64 | 2-Naphthylamine-4,6,8-trisulfonic acid →1-Amino-2-methoxy-5-sulfo-acetylaminobenzene | 1-Amino-8-hydroxy-naphthalene-3,6-disulfonic acid | 2,4,6-Trifluoro-s-triazine | $H_2N-$⟨⟩$-CONHCH_2CH_2SO_2-CH_2-CH_2-Cl$ |
| 65 | 2-Naphthylamine-4,6,8-trisulfonic acid →1-Amino-2-methoxy-5-sulfo-acetylaminobenzene | 1-Amino-8-hydroxy-naphthalene-3,6-disulfonic acid | 2,4,6-Trifluoro-s-triazine | $H_2N-$⟨⟩$-$ (ortho) $CONHCH_2CH_2SO_2-CH_2-CH_2-Cl$ |

EXAMPLE 3

31.9 g of 1-amino-8-hydroxynaphthalene-3,6-disulfonic acid are reacted with 18.5 g of cyanuric chloride in accordance with the instructions given in Example 1.

Similarly, 50.9 g of 4-amino-3-methoxy-6-methyl-2'-sulfo-4'-sulfoethylsulfonyl-1,1'-azobenzene are diazotized and coupled in accordance with the instructions given in Example 1.

After the coupling has ended, 26.5 g of 2-(β-aminoethoxy)-ethyl 2'-chloroethyl sulfone hydrochloride are added to the reaction mixture and condensed, and the product is isolated, all three steps likewise being carried out in accordance with the instructions given in Example 1. The dye, which in the form of free acid conforms to the formula

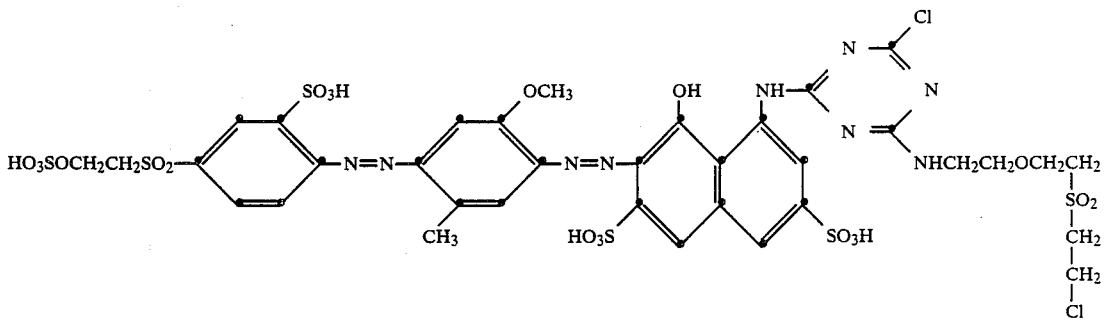

dyes cotton in blue shades having good fastness properties.

A similar method can be used to prepare the dyes mentioned in Table 3.

TABLE 3

| No. | Monoazo dye | Coupling component | Reactive component | Amine |
|---|---|---|---|---|
| 1 | [Structure: benzene with $SO_3H$, $SO_2CH_2CH_2OSO_3H$, $-N=N-$ to benzene with $OCH_3$, $NH_2$, $CH_3$] | 1-Amino-8-hydroxy-naphthalene-3,6-disulfonic acid | 2,4,6-Trichloro-s-triazine | $H_2NCH_2CH_2SO_2CH_2CH_2Cl$ |
| 2 | [Structure: benzene with $SO_3H$, $SO_2CH_2CH_2OSO_3H$, $-N=N-$ to benzene with $OCH_3$, $NH_2$, $CH_3$] | 1-Amino-8-hydroxy-naphthalene-3,6-disulfonic acid | 2,4,6-Trichloro-s-triazine | [Structure: $H_2N$-benzene-$SO_2CH_2CH_2OSO_3H$] |
| 3 | [Structure: benzene with $SO_3H$, $SO_2CH_2CH_2OSO_3H$, $-N=N-$ to benzene with $OCH_3$, $NH_2$, $CH_3$] | 1-Amino-8-hydroxy-naphthalene-3,6-disulfonic acid | 2,4,6-Trichloro-s-triazine | 1-Aminobenzene-3-sulfonic acid |
| 4 | [Structure: benzene with $SO_3H$, $SO_2CH_2CH_2OSO_3H$, $-N=N-$ to benzene with $OCH_3$, $NH_2$, $CH_3$] | 1-Amino-8-hydroxy-naphthalene-3,6-disulfonic acid | 4-(β-Chloroethyl-sulfonyl)-butyryl chloride | — |
| 5 | [Structure: benzene with $SO_3H$, $SO_2CH_2CH_2OSO_3H$, $-N=N-$ to benzene with $OCH_3$, $NH_2$, $CH_3$] | 1-Amino-8-hydroxy-naphthalene-3,6-disulfonic acid | α,β-Dibromo-propionyl chloride | — |
| 6 | [Structure: benzene with $SO_3H$, $SO_2CH_2CH_2OSO_3H$, $-N=N-$ to benzene with $OCH_3$, $NH_2$, $CH_3$] | 1-Amino-8-hydroxy-naphthalene-3,6-disulfonic acid | 2,4,6-Trichloro-5-chloropyrimidine | — |
| 7 | [Structure: benzene with $SO_3H$, $SO_2CH_2CH_2OSO_3H$, $-N=N-$ to benzene with $OCH_3$, $NH_2$, $NHCOCH_2SO_3H$] | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 8 | [Structure: benzene with $SO_3H$, $SO_2CH_2CH_2OSO_3H$, $-N=N-$ to benzene with $OCH_3$, $NH_2$, $NHCOCH_2SO_3H$] | 1-Amino-8-hydroxy-naphthalene-3,6-disulfonic acid | 2,4,6-Trichloro-s-triazine | $H_2NCH_2CH_2SO_2CH_2CH_2Cl$ |
| 9 | [Structure: benzene with $SO_3H$, $SO_2CH_2CH_2OSO_3H$, $-N=N-$ to benzene with $OCH_3$, $NH_2$, $NHCOCH_2SO_3H$] | 1-Amino-8-hydroxy-naphthalene-3,6-disulfonic acid | 2,4,6-Trichloro-s-triazine | [Structure: $H_2N$-benzene-$SO_2CH_2CH_2OSO_3H$] |
| 10 | [Structure: benzene with $SO_3H$, $SO_2CH_2CH_2OSO_3H$, $-N=N-$ to benzene with $OCH_3$, $NH_2$, $NHCOCH_2SO_3H$] | 1-Amino-8-hydroxy-naphthalene-3,6-disulfonic acid | 2,4,6-Trichloro-s-triazine | [Structure: $H_2N$-benzene-$CONHCH_2CH_2SO_2CH_2CH_2Cl$] |

TABLE 3-continued

| No. | Monoazo dye | Coupling component | Reactive component | Amine |
|---|---|---|---|---|
| 11 | 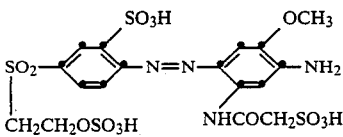 | 1-Amino-8-hydroxy-naphthalene-3,6-disulfonic acid | 4-(β-Chloroethyl-sulfonyl)-butyryl chloride | — |
| 12 | 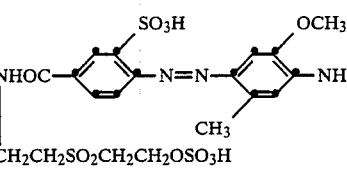 | 1-Amino-8-hydroxy-naphthalene-3,6-disulfonic acid | 2,4,6-Trichloro-s-triazine | 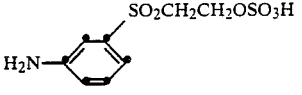 |
| 13 | 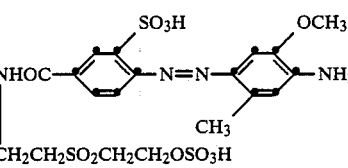 | 1-Amino-8-hydroxy-naphthalene-3,6-disulfonic acid | 2,4,6-Trichloro-s-triazine | 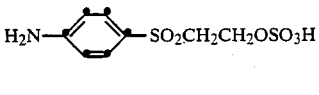 |
| 14 | 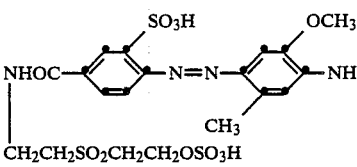 | 1-Amino-8-hydroxy-naphthalene-3,6-disulfonic acid | 2,4,6-Trichloro-s-triazine | 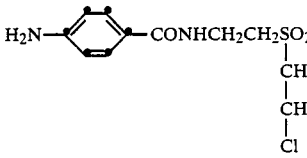 |
| 15 | 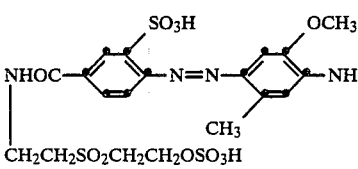 | 1-Amino-8-hydroxy-naphthalene-3,6-disulfonic acid | 2,4,6-Trichloro-s-triazine | $H_2NCH_2CH_2SO_2CH_2CH_2Cl$ |
| 16 | 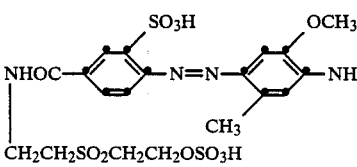 | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 17 | 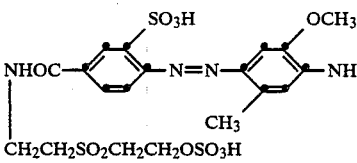 | 1-Amino-8-hydroxy-naphthalene-4,6-disulfonic acid | 2,4,6-Trichloro-s-triazine | $H_2NCH_2CH_2OCH_2CH_2SO_2CH_2CH_2Cl$ |
| 18 | 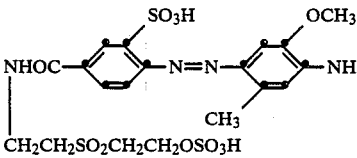 | 1-Amino-8-hydroxy-naphthalene-3,6-disulfonic acid | 4-(β-Chloroethyl-sulfonyl)-butyryl chloride | — |
| 19 | 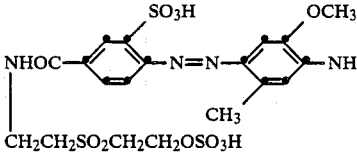 | 1-Amino-8-hydroxy-naphthalene-3,6-disulfonic acid | α,β-Dibromo-propionyl chloride | — |

TABLE 3-continued

| No. | Monoazo dye | Coupling component | Reactive component | Amine |
|---|---|---|---|---|
| 20 | 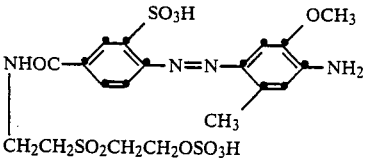 | 1-Amino-8-hydroxy-naphthalene-3,6-disulfonic acid | 2,4,6-Trichloro-5-chloropyrimidine | — |
| 21 | 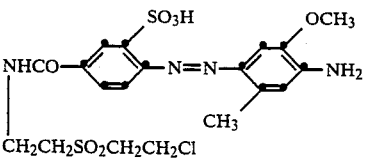 | 1-Amino-8-hydroxy-naphthalene-3,6-disulfonic acid | 2,4,6-Trichloro-s-triazine | $H_2NCH_2CH_2SO_2CH_2CH_2Cl$ |
| 22 | 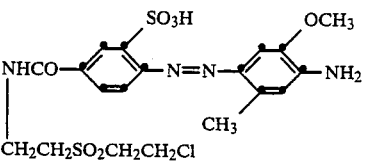 | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 23 | 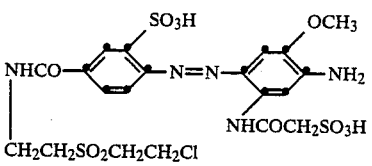 | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 24 | 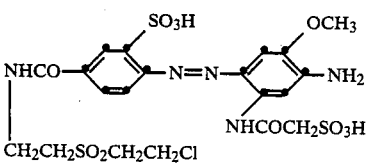 | 1-Amino-8-hydroxy-naphthalene-3,6-disulfonic acid | 2,4,6-Trichloro-s-triazine | 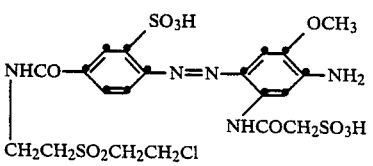 |
| 25 | 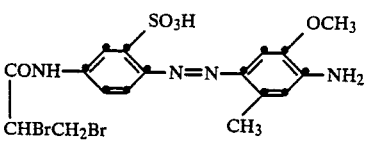 | 1-Amino-8-hydroxy-naphthalene-3,6-disulfonic acid | 4-(β-Chloroethyl-sulfonyl)-butyryl chloride | — |
| 26 | 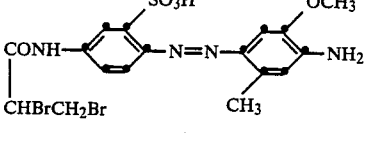 | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 27 | 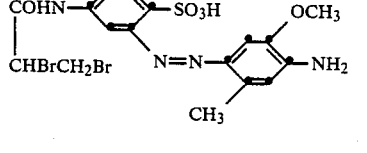 | 1-Amino-8-hydroxy-naphthalene-3,6-disulfonic acid | 2,4,6-Trichloro-s-triazine | 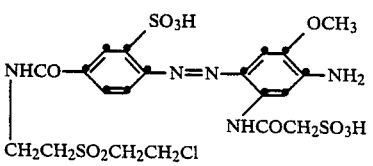 |
| 28 | 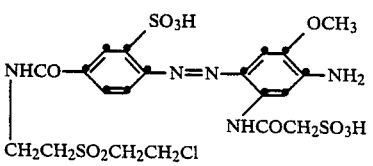 | 1-Amino-8-hydroxy-naphthalene-3,6-disulfonic acid | 2,4,6-Trichloro-s-triazine | 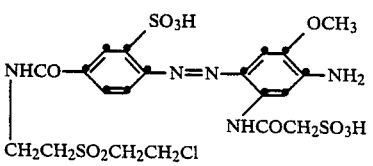 |

TABLE 3-continued

| No. | Monoazo dye | Coupling component | Reactive component | Amine |
|---|---|---|---|---|
| 29 | COHN-[benzene-SO₃H]-N=N-[benzene(OCH₃, CH₃)]-NH₂ ; CHBrCH₂Br on COHN nitrogen | 1-Amino-8-hydroxy-naphthalene-3,6-disulfonic acid | 2,4,6-Trichloro-s-triazine | $H_2NCH_2CH_2OCH_2CH_2SO_2CH_2CH_2Cl$ |
| 30 | COHN-[benzene-SO₃H]-N=N-[benzene(OCH₃, CH₃)]-NH₂ ; CHBrCH₂Br on COHN nitrogen | 1-Amino-8-hydroxy-naphthalene-3,6-disulfonic acid | 4-(β-Chloroethyl-sulfonyl)-butyryl chloride | — |
| 31 | COHN-[benzene(SO₃H)]-N=N-[benzene(OCH₃, CH₃)]-NH₂ ; $(CH_2)_3SO_2CH_2CH_2Cl$ on COHN nitrogen | 1-Amino-8-hydroxy-naphthalene-3,6-disulfonic acid | 4-(β-Chloroethyl-sulfonyl)-butyryl chloride | — |
| 32 | COHN-[benzene(SO₃H)]-N=N-[benzene(OCH₃, CH₃)]-NH₂ ; $(CH_2)_3SO_2CH_2CH_2Cl$ on COHN nitrogen | 1-Amino-8-hydroxy-naphthalene-3,6-disulfonic acid | 2,4,6-Trichloro-s-triazine | $H_2NCH_2CH_2OCH_2CH_2SO_3CH_2CH_2Cl$ |
| 33 | COHN-[benzene(SO₃H)]-N=N-[benzene(OCH₃, CH₃)]-NH₂ ; $(CH_2)_3SO_2CH_2CH_2Cl$ on COHN nitrogen | 1-Amino-8-hydroxy-naphthalene-3,6-disulfonic acid | 2,4,6-Trichloro-s-triazine | $H_2NCH_2CH_2SO_3CH_2CH_2Cl$ |
| 34 | N=N-[benzene(OCH₃, CH₃)]-NH₂ ; COHN-[benzene-SO₃H]- ; $(CH_2)_3SO_2CH_2CH_2Cl$ on COHN nitrogen | 1-Amino-8-hydroxy-naphthalene-3,6-disulfonic acid | 2,4,6-Trichloro-s-triazine | $H_2NCH_2CH_2OCH_2SO_2CH_2CH_2Cl$ |
| 35 | N=N-[benzene(OCH₃, CH₃)]-NH₂ ; COHN-[benzene-SO₃H]- ; $(CH_2)_3SO_2CH_2CH_2Cl$ on COHN nitrogen | 1-Amino-8-hydroxy-naphthalene-3,6-disulfonic acid | 4-(β-Chloroethyl-sulfonyl)-butyryl chloride | — |

EXAMPLE 4

15.9 g of 1-amino-8-hydroxynaphthalene-3,6-disulfonic acid are reacted in accordance with the instructions of Example 2 with 7.5 g of 2,4,6-trifluorotriazine and then with 16.4 g of 3-amino-N'-β-(β'-chloroethylsulfonyl)-ethyl benzamide hydrochloride.

In a similar manner, 25.4 g of 4-amino-3-methoxy-6-methyl-2'-sulfo-4'-β'-sulfatoethylsulfonyl-1,1'-azobenzene are diazotized and coupled in accordance with the instructions of Example 1.

After the coupling has ended, the dye of the formula

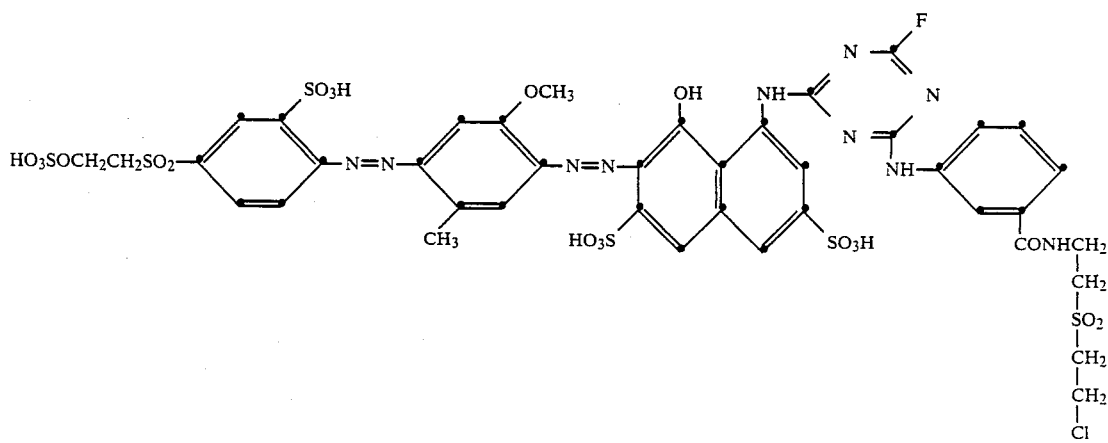

is isolated by salting out. Dried, it is a bluish black powder and dyes cotton in blue shades having good fastness properties.

A similar method can be used to prepare the dyes mentioned in Table 4.

TABLE 4

| No. | Monoazo dye | Coupling component | Reactive component | Amine |
|---|---|---|---|---|
| 1 | (structure with SO₃H, OCH₃, SO₂CH₂CH₂OSO₃H, CH₃, NH₂, N=N) | 1-Amino-8-hydroxy-naphthalene-3,6-disulfonic acid | 2,4,6-Trifluoro-s-triazine | $H_2N$—⌬—$SO_2CH_2CH_2OSO_3H$ |
| 2 | (same monoazo structure) | 1-Amino-8-hydroxy-naphthalene-3,6-disulfonic acid | 2,4,6-Trifluoro-s-triazine | 1-Amino-4-chlorobenzene |
| 3 | (same monoazo structure) | 1-Amino-8-hydroxy-naphthalene-3,6-disulfonic acid | 2,4,6-Trifluoro-s-triazine | $H_2N$—⌬—$CONHCH_2CH_2SO_2CH_2CH_2OSO_3H$ |
| 4 | (same monoazo structure) | 1-Amino-8-hydroxy-naphthalene-4,6-disulfonic acid | 2,4,6-Trifluoro-s-triazine | $H_2N$—⌬—$CONHCH_2CH_2SO_2CH_2CH_2OSO_3H$ |
| 5 | (monoazo with NHCOCH₃) | 1-Amino-8-hydroxy-naphthalene-3,6-disulfonic acid | 2,4,6-Trifluor triazin | $H_2N$—⌬—$CONHCH_2CH_2SO_2CH_2CH_2OSO_3H$ |
| 6 | (monoazo with NHCOCH₃) | 1-Amino-8-hydroxy-naphthalene-3,6-disulfonic acid | 2,4,6-Trifluoro-s-triazine | $H_2N$—⌬—$SO_2CH_2CH_2OSO_3H$ |

TABLE 4-continued

| No. | Monoazo dye | Coupling component | Reactive component | Amine |
|---|---|---|---|---|
| 7 | Structure: benzene ring with $SO_3H$, $SO_2CH_2CH_2OSO_3H$, linked by $N=N$ to benzene with $OCH_3$, $NH_2$, $NHCOCH_3$ | 1-Amino-8-hydroxy-naphthalene-3,6-disulfonic acid | 2,4,6-Trifluoro-s-triazine | N—Ethylaminobenzene |
| 8 | Structure: benzene with $SO_3H$, $SO_2CH_2CH_2SO_2CH_2CH_2OSO_3H$, $N=N$, benzene with $OCH_3$, $NH_2$, $NHCOCH_3$ | 1-Amino-8-hydroxy-naphthalene-3,6-disulfonic acid | 2,4,6-Trifluoro-s-triazine | 1-Amino-3-chlorobenzene |
| 9 | Structure: benzene with $SO_3H$, NHOC–, $CH_2CH_2SO_2CH_2CH_2OSO_3H$, $N=N$, benzene with $OCH_3$, $NH_2$, $CH_3$ | 1-Amino-8-hydroxy-naphthalene-3,6-disulfonic acid | 2,4,6-Trifluoro-s-triazine | $H_2N$—benzene—$SO_2CH_2CH_2OSO_3H$ |
| 10 | Structure: benzene with $SO_3H$, NHOC–, $CH_2CH_2SO_2CH_2CH_2OSO_3H$, $N=N$, benzene with $OCH_3$, $NH_2$, $CH_3$ | 1-Amino-8-hydroxy-naphthalene-3,6-disulfonic acid | 2,4,6-Trifluoro-s-triazine | $H_2N$—benzene—$CONHCH_2CH_2SO_2CH_2CH_2Cl$ |
| 11 | Structure: benzene with $SO_3H$, NHOC–, $CH_2CH_2SO_2CH_2CH_2OSO_3H$, $N=N$, benzene with $OCH_3$, $NH_2$, $CH_3$ | 1-Amino-8-hydroxy-naphthalene-3,6-disulfonic acid | 2,4,6-Trifluoro-s-triazine | $H_2N$—benzene—$CONHCH_2CH_2SO_2CH_2CH_2OSO_3H$ |
| 12 | Structure: benzene with $SO_3H$, NHOC–, $CH_2CH_2SO_2CH_2CH_2OSO_3H$, $N=N$, benzene with $OCH_3$, $NH_2$, $CH_3$ | 1-Amino-8-hydroxy-naphthalene-3,6-disulfonic acid | 2,4,6-Trifluoro-s-triazine | N—Methyl-aminobenzene |
| 13 | Structure: benzene with NHOC–, $CH_2CH_2SO_2CH_2CH_2OSO_3H$, $SO_3H$, $N=N$, benzene with $OCH_3$, $NH_2$, $CH_3$ | 1-Amino-8-hydroxy-naphthalene-3,6-disulfonic acid | 2,4,6-Trichloro-s-triazine | $H_2N$—benzene—$SO_2CH_2CH_2OSO_3H$ |
| 14 | Structure: benzene with NHOC–, $CH_2CH_2SO_2CH_2CH_2OSO_3H$, $SO_3H$, $N=N$, benzene with $OCH_3$, $NH_2$, $CH_3$ | 1-Amino-8-hydroxy-naphthalene-3,6-disulfonic acid | 2,4,6-Trichloro-s-triazine | $H_2N$—benzene—$CONHCH_2CH_2SO_2CH_2CH_2OSO_3H$ |
| 15 | Structure: benzene with $SO_3H$, NHOC–, $CH_2CH_2SO_2CH_2CH_2Cl$, $N=N$, benzene with $OCH_3$, $NH_2$, $NHCOCH_3$ | 1-Amino-8-hydroxy-naphthalene-3,6-disulfonic acid | 2,4,6-Trichloro-s-triazine | $H_2N$—benzene—$CONHCH_2CH_2SO_2CH_2CH_2OSO_3H$ |

TABLE 4-continued

| No. | Monoazo dye | Coupling component | Reactive component | Amine |
|---|---|---|---|---|
| 16 | 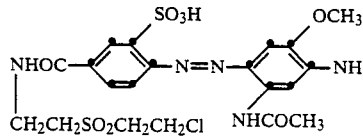 | 1-Amino-8-hydroxy-naphthalene-3,6-disulfonic acid | 2,4,6-Trichloro-s-triazine | 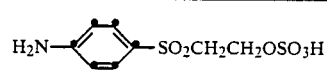 |
| 17 | 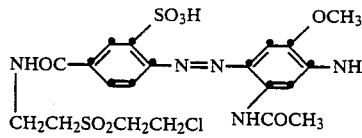 | 1-Amino-8-hydroxy-naphthalene-3,6-disulfonic acid | 2,4,6-Trichloro-s-triazine | N—Methyl-aminobenzene |
| 18 | 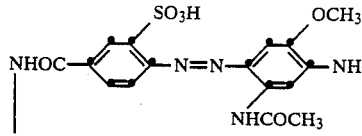 | 1-Amino-8-hydroxy-naphthalene-3,6-disulfonic acid | 2,4,6-Trichloro-s-triazine | 1-Amino-2-methylbenzen |
| 19 | 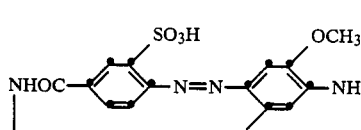 | 1-Amino-8-hydroxy-naphthalene-3,6-disulfonic acid | 2,4,6-Trichloro-s-triazine | 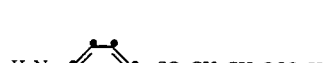 |
| 20 | 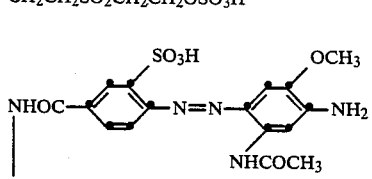 | 1-Amino-8-hydroxy-naphthalene-3,6-disulfonic acid | 2,4,6-Trichloro-s-triazine |  |
| 21 | 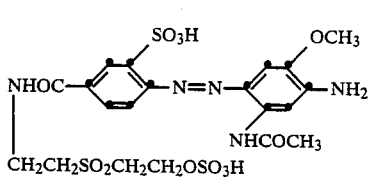 | 1-Amino-8-hydroxy-naphthalene-4,6-disulfonic acid | 2,4,6-Trichloro-s-triazine | 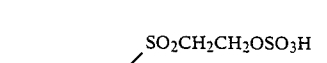 |
| 22 | 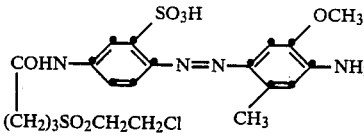 | 1-Amino-8-hydroxy-naphthalene-3,6-disulfonic acid | 2,4,6-Trichloro-s-triazine | 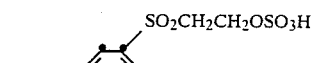 |
| 23 | 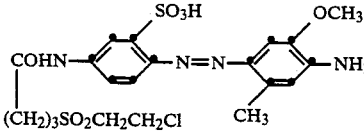 | 1-Amino-8-hydroxy-naphthalene-3,6-disulfonic acid | 2,4,6-Trichloro-s-triazine | 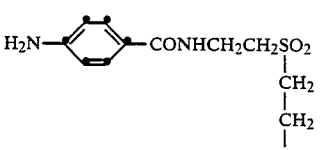 |
| 24 | 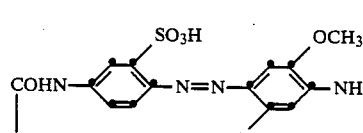 | 1-Amino-8-hydroxy-naphthalene-3,6-disulfonic acid | 2,4,6-Trichloro-s-triazine | 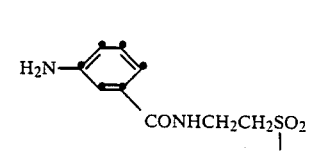 |

TABLE 4-continued

| No. | Monoazo dye | Coupling component | Reactive component | Amine |
|---|---|---|---|---|
| 25 | COHN-[benzene with SO$_3$H]-N=N-[benzene with OCH$_3$, CH$_3$]-NH$_2$; (CH$_2$)$_3$SO$_2$CH$_2$CH$_2$Cl | 1-Amino-8-hydroxy-naphthalene-3,6-disulfonic acid | 2,4,6-Trichloro-s-triazine | 1-Amino-4-chlorobenzene |
| 26 | COHN-[benzene with SO$_3$H]-N=N-[benzene with OCH$_3$, CH$_3$]-NH$_2$; (CH$_2$)$_3$SO$_2$CH$_2$CH$_2$Cl | 1-Amino-8-hydroxy-naphthalene-3,6-disulfonic acid | 2,4,6-Trichloro-s-triazine | 1-Amino-methylbenzene |
| 27 | COHN-[benzene with SO$_3$H]-N=N-[benzene with OCH$_3$, NHCOCH$_3$]-NH$_2$; (CH$_2$)$_3$SO$_2$CH$_2$CH$_2$Cl | 1-Amino-8-hydroxy-naphthalene-3,6-disulfonic acid | 2,4,6-Trifluoro-s-triazine | H$_2$N-[benzene]-SO$_2$CH$_2$CH$_2$OSO$_3$H |
| 28 | COHN-[benzene with SO$_3$H]-N=N-[benzene with OCH$_3$, NHCOCH$_3$]-NH$_2$; (CH$_2$)$_3$SO$_2$CH$_2$CH$_2$Cl | 1-Amino-8-hydroxy-naphthalene-3,6-disulfonic acid | 2,4,6-Trifluoro-s-triazine | H$_2$N-[benzene]-CONHCH$_2$CH$_2$SO$_2$CH$_2$CH$_2$Cl |
| 29 | COHN-[benzene with SO$_3$H]-N=N-[benzene with OCH$_3$, NHCOCH$_3$]-NH$_2$; (CH$_2$)$_3$SO$_2$CH$_2$CH$_2$Cl | 1-Amino-8-hydroxy-naphthalene-3,6-disulfonic acid | 2,4,6-Trifluoro-s-triazine | N—Ethyl-aminobenzene |
| 30 | COHN-[benzene with SO$_3$H]-N=N-[benzene with OCH$_3$, NHCOCH$_3$]-NH$_2$; CHBrCH$_2$Br | 1-Amino-8-hydroxy-naphthalene-3,6-disulfonic acid | 2,4,6-Trifluoro-s-triazine | N—(2-Hydroxyethyl)-aminobenzene |
| 31 | COHN-[benzene with SO$_3$H]-N=N-[benzene with OCH$_3$, NHCOCH$_3$]-NH$_2$; CHBrCH$_2$Br | 1-Amino-8-hydroxy-naphthalene-3,6-disulfonic acid | 2,4,6-Trifluoro-s-triazine | H$_2$N-[benzene]-NHCH$_2$CH$_2$SO$_2$CH$_2$CH$_2$OSO$_3$H |
| 32 | COHN-[benzene with SO$_3$H]-N=N-[benzene with OCH$_3$, NHCOCH$_3$]-NH$_2$; CHBrCH$_2$Br | 1-Amino-8-hydroxy-naphthalene-3,6-disulfonic acid | 2,4,6-Trifluoro-s-triazine | H$_2$N-[benzene]-NHCO(CH$_2$)$_3$SO$_2$CH$_2$CH$_2$Cl |
| 33 | COHN-[benzene with SO$_3$H]-N=N-[benzene with OCH$_3$, CH$_3$]-NH$_2$; CHBrCH$_2$Br | 1-Amino-8-hydroxy-naphthalene-3,6-disulfonic acid | 2,4,6-Trifluoro-s-triazine | H$_2$N-[benzene]-NHCO(CH$_2$)$_3$SO$_2$CH$_2$CH$_2$Cl |

TABLE 4-continued

| No. | Monoazo dye | Coupling component | Reactive component | Amine |
|---|---|---|---|---|
| 34 | COHN–⟨ ⟩–N=N–⟨ ⟩–NH₂ (OCH₃, SO₃H, CH₃, CHBrCH₂Br) | 1-Amino-8-hydroxy-naphthalene-3,6-disulfonic acid | 2,4,6-Trifluoro-s-triazine | H₂N–⟨ ⟩–CONHCH₂CH₂SO₂–CH₂–CH₂–Cl |
| 35 | COHN–⟨ ⟩–N=N–⟨ ⟩–NH₂ (OCH₃, SO₃H, CH₃, CHBrCH₂Br) | 1-Amino-8-hydroxy-naphthalene-3,6-disulfonic acid | 2,4,6-Trifluoro-s-triazine | H₂N–⟨ ⟩–SO₂CH₂CH₂OSO₃H |
| 36 | COHN–⟨ ⟩–N=N–⟨ ⟩–NH₂ (OCH₃, SO₃H, CH₃, CHBrCH₂Br) | 1-Amino-8-hydroxy-naphthalene-3,6-disulfonic acid | 2,4,6-Trifluoro-s-triazine | H₂N–⟨ ⟩–SO₂CH₂CH₂OSO₃H |
| 37 | COHN–⟨ ⟩–N=N–⟨ ⟩–NH₂ (OCH₃, SO₃H, CH₃, CHBrCH₂Br) | 1-Amino-8-hydroxy-naphthalene-3,6-disulfonic acid | 2,4,6-Trifluoro-s-triazine | 1-Amino-2-methylbenzene |

DYEING METHOD I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water; to this solution are added 50 parts of a solution which contains per liter 16 g of sodium hydroxide and 0.04 liter of 38° Bé sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100 to 102° C. for 30 seconds, is rinsed, is soaped off at the boil with a 0.3% strength solution of a nonionic detergent for a quarter of an hour, is rinsed and is dried.

PRINTING METHOD I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

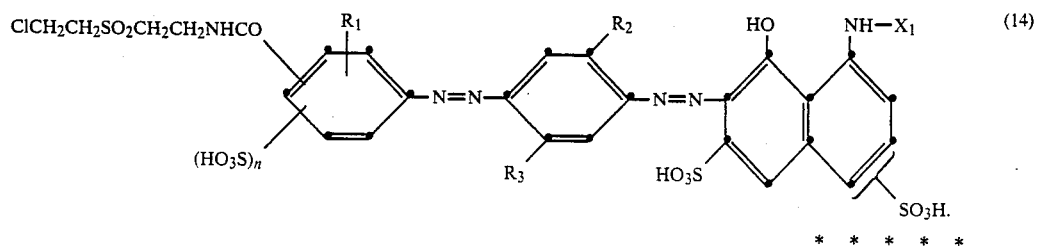

What is claimed is:

1. A fibre-reactive dye of the formula

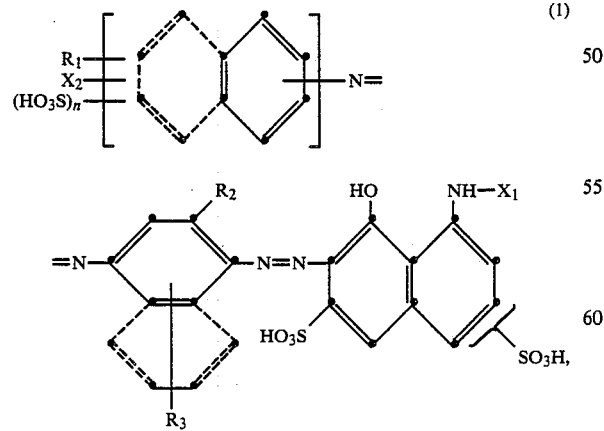

(1)

in which $R_1$ is hydrogen, halogen, $C_{1-4}$-alkyl, $C_{1-4}$-alkoxy, nitro or carboxyl;

$X_2$ is hydrogen, vinylsulfonyl, $\beta$-chloroethylsulfonyl, $\beta$-sulfatoethylsulfonyl, $\beta$-acetoxyethylsulfonyl or a radical of the formula $Cl-CH_2-CH_2-SO_2-CH_2-CH_2-CH_2-CO-NH-$ or $Cl-CH_2-CH_2-SO_2-CH_2-CH_2-NH-CO-$;

n is 1 to 3;

$R_2$ is $C_1-C_4$alkyl or $C_1-C_4$ alkoxy; $R_3$ is hydrogen $C_1-C_4$alkyl, $C_1-C_4$ alkoxy, acetylamino, sulfoacetylamino, ureido or sulfo;

$X_1$ is a fibre-reactive radical of the formula

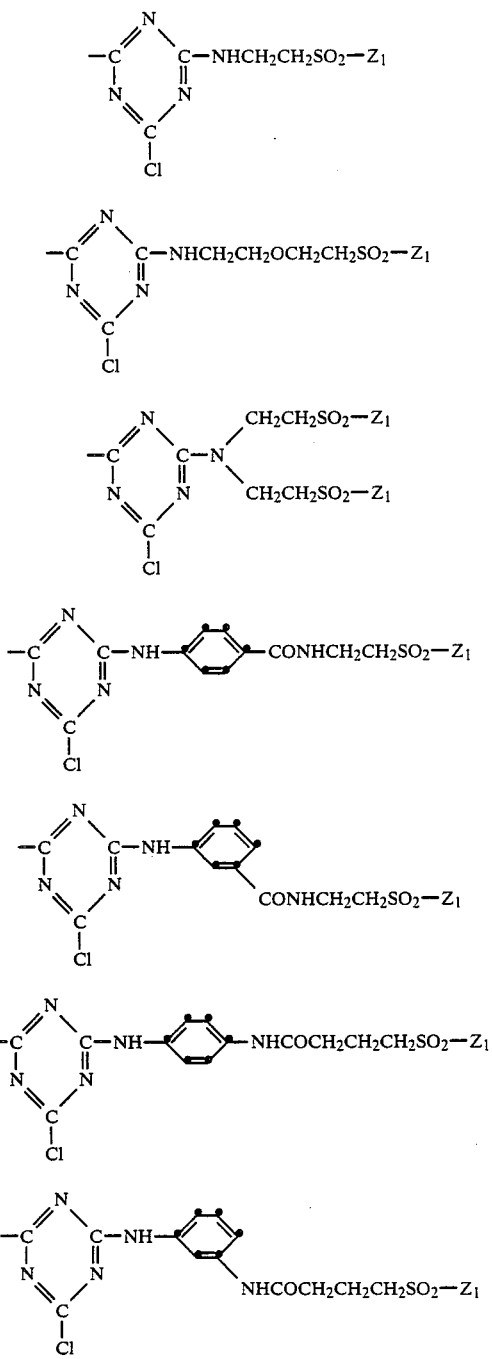

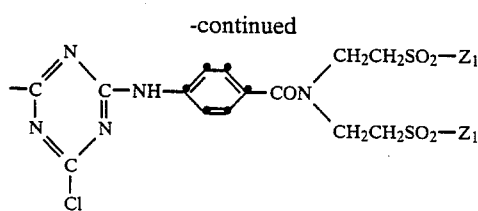

or a corresponding fluorotriazine radical; and $Z_1$ is vinyl, β-chloroethyl, β-sulfatoethyl, or β-acetoxyethyl.

2. A fibre reactive dye according to claim 1 of the formula

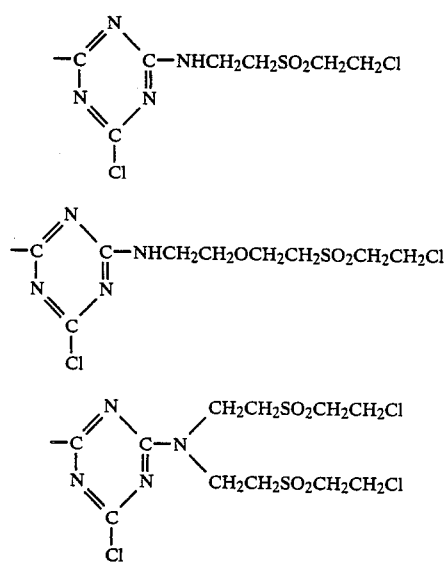

(2)

in which $R_1$ is hydrogen, chlorine methyl, ethyl, methoxy, ethoxy, nitro or carboxyl; $R_2$ is methyl, ethyl, methoxy or ethoxy; $R_3$ is hydrogen, methyl, ethyl, methoxy, ethoxy, acetylamino, ureido or sulfo; n is 1 or 2; and $X_1$ and $X_2$ are as defined in claim 1.

3. A fibre-reactive dye according to claim 1, wherein $X_1$ is a fibre-reactive radical of the formula

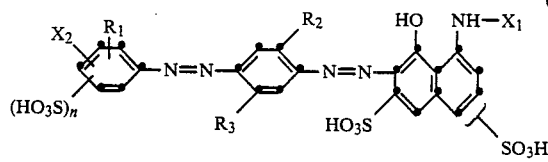

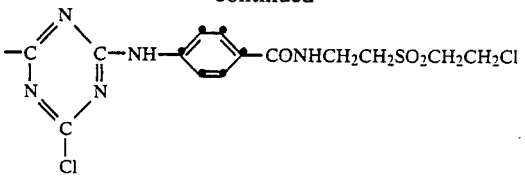

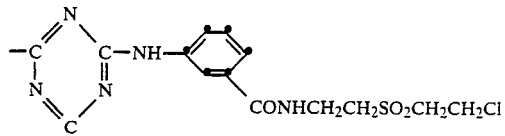

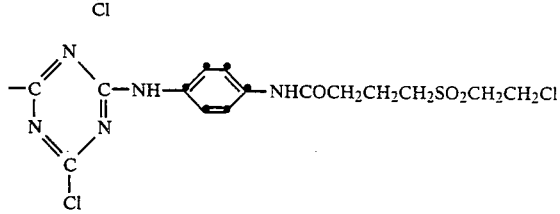

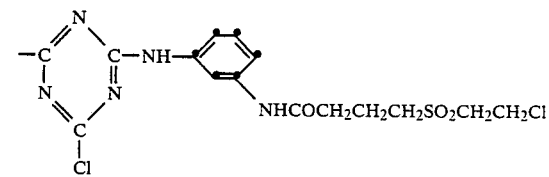

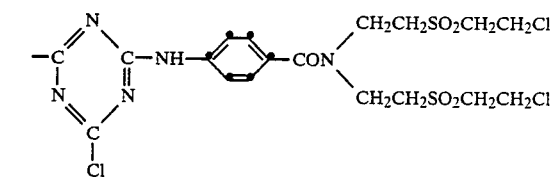

or a corresponding fluorotriazine radical.

4. A fibre-reactive dye according to claim 1, wherein $X_2$ is hydrogen, vinylsulfonyl, β-chloroethylsulfonyl, β-sulfatoethylsulfonyl or β-acetoxyethylsulfonyl.

5. A fibre-reactive dye according to claim 1, wherein $X_2$ is hydrogen.

6. A fibre-reactive dye according to claim 1, wherein $X_2$ is vinylsulfonyl, β-chloroethylsulfonyl, β-sulfatoethylsulfonyl or β-acetoxyethylsulfonyl.

7. A fibre reactive dye according to claim 1, of the formula (3)

in which $R_2$ is methyl, ethyl, methoxy or ethoxy; $R_3$ is hydrogen, methyl, ethyl, methoxy, ethoxy, acetylamino, ureido or sulfo; n is 1 to 3; and $X_1$ is as defined in claim 23.

8. A fibre reactive dye according to claim 1, of the formula

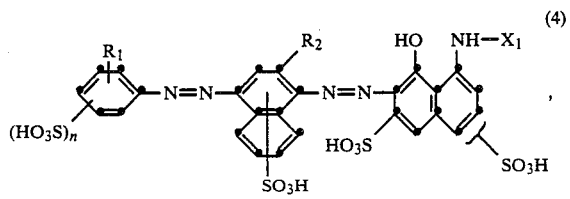
(4)

in which $R_1$ is hydrogen, chlorine, methyl, ethyl, methoxy, ethoxy, nitro or carboxyl; $R_2$ is methyl, ethyl, methoxy or ethoxy; n is 1 to 2, and $X_1$ is a fibre active radical.

9. A fibre reactive dye according to claim 2, of the formula

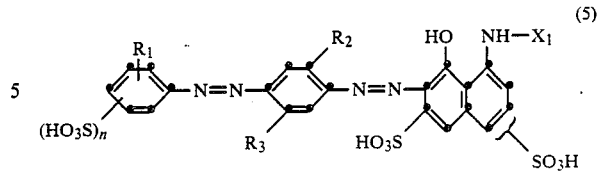
(5)

in which $R_1$, $R_2$, $R_3$ and n are as defined in claim 2; and $X_1$ is a fibre-reactive radical.

10. A fibre reactive dye according to claim 2, of the formula

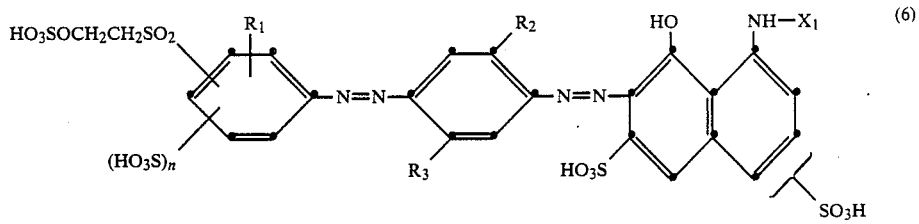
(6)

in which $R_1$, $R_2$, $R_3$ and n as defined in claim 2; and $X_1$

11. A fibre reactive dye according to claim 1, of the formula

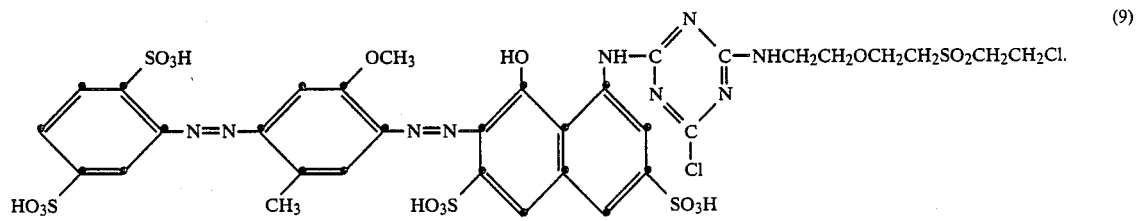
(9)

12. A fibre reactive dye according to claim 1, of the formula

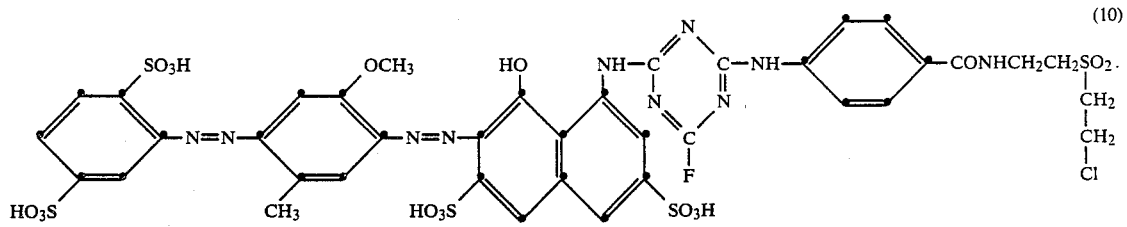
(10)

13. A fibre reactive dye according to claim 1, of the formula

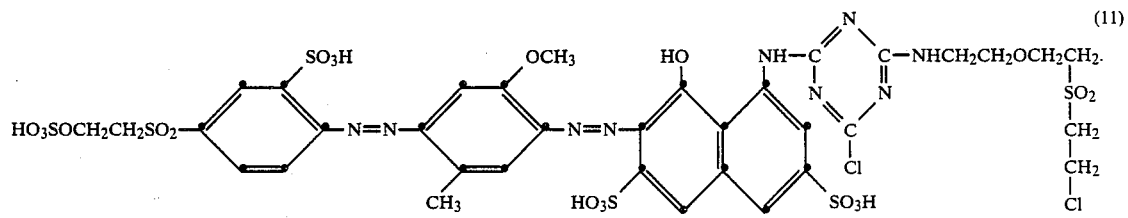
(11)

14. A fibre reactive dye according to claim 2, of the formula